(12) United States Patent
Balog

(10) Patent No.: US 8,615,065 B2
(45) Date of Patent: Dec. 24, 2013

(54) MODULAR RADIAL NEUTRON REFLECTOR

(75) Inventor: Leonard J. Balog, Naples, FL (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 381 days.

(21) Appl. No.: 12/904,347

(22) Filed: Oct. 14, 2010

(65) Prior Publication Data
US 2011/0096890 A1 Apr. 28, 2011

Related U.S. Application Data

(60) Provisional application No. 61/279,486, filed on Oct. 22, 2009.

(51) Int. Cl.
*G21C 5/00* (2006.01)

(52) U.S. Cl.
USPC .......................................... 376/458; 376/351

(58) Field of Classification Search
USPC .................................. 376/351, 458
See application file for complete search history.

(56) References Cited

U.S. PATENT DOCUMENTS

| 4,146,430 | A | * | 3/1979 | Berringer ...................... 376/399 |
| 4,701,299 | A | | 10/1987 | Alibran et al. |
| 4,731,220 | A | * | 3/1988 | Kim, Jr. ......................... 376/458 |
| 4,751,043 | A | | 6/1988 | Freeman et al. |
| 4,849,162 | A | | 7/1989 | Garner et al. |
| 4,941,159 | A | * | 7/1990 | Schwirian et al. ............ 376/458 |
| 5,319,692 | A | | 6/1994 | Hopkins et al. |
| 5,680,424 | A | | 10/1997 | Foster |
| 5,864,594 | A | * | 1/1999 | Balog et al. ................... 376/260 |
| 2008/0279326 | A1 | * | 11/2008 | Gilmore et al. ............... 376/395 |

* cited by examiner

*Primary Examiner* — Timothy A Brainard
(74) *Attorney, Agent, or Firm* — Joseph C. Spadacene; Westinghouse Electric Company LLC

(57) ABSTRACT

A lower internals nuclear reactor structure having a tubular core barrel with an upper and lower open end, coaxially supported therein. A reflector having an outside curvature that substantially matches the curvature of the inside surface of the core barrel and substantially contacts the inside surface substantially over an axial length of the core, is fixedly connected to the inside surface of the core barrel at a plurality of axial and circumferential locations to be substantially supported by the inside surface of the core barrel.

18 Claims, 19 Drawing Sheets

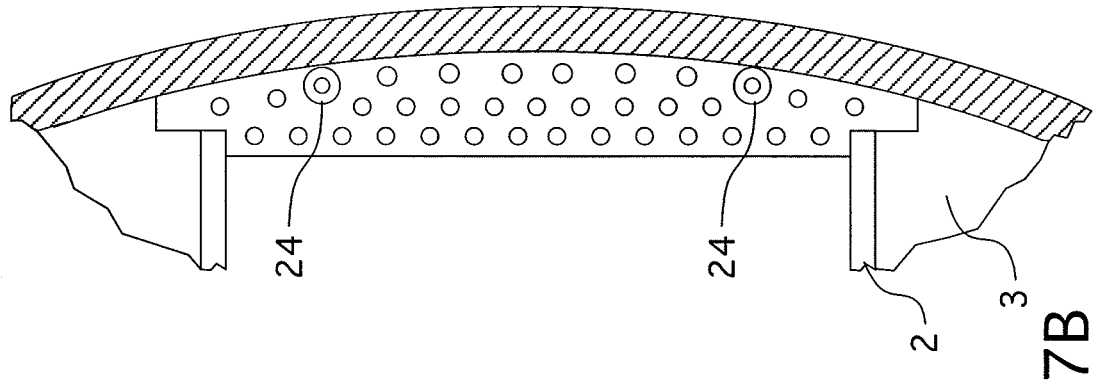
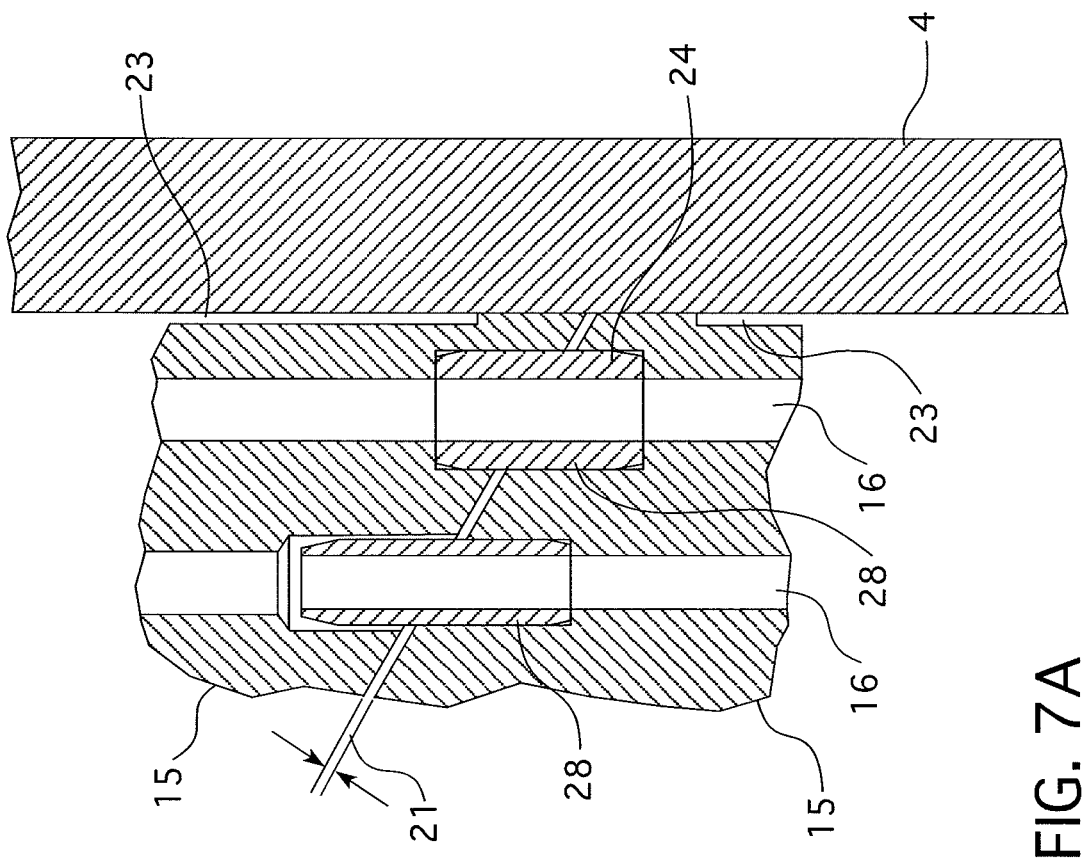
FIG. 7A
FIG. 7B

MODULAR RADIAL NEUTRON REFLECTOR

CROSS REFERENCE TO RELATED APPLICATION

This application is related to Provisional Patent Application Ser. No. 61/279,486, filed Oct. 22, 2009 and claims priority thereto.

BACKGROUND OF THE INVENTION

1. Field of the Invention

This invention relates in general to the field of pressurized light water nuclear reactors and, in particular, to radial neutron reflectors which surround the nuclear core for improved neutron economy to lower fuel costs and reduce the radiation dose on the pressure vessel.

2. Related Art

The fission reactions in a nuclear reactor generate heat and release neutrons which produce additional fission reactions in the nuclear fuel. The fissile material is massed in the reactor such that the neutron flux density is sufficient to maintain a sustained fission process. In a commercial reactor, pellets of the fissile material are encased in zircoloy rods mounted in modular, elongated fuel assemblies which are generally square in cross section. A large number of these square, elongated fuel assemblies are massed to form a generally cylindrical reactor core which is housed inside a cylindrical stainless steel core barrel between horizontal upper and lower stainless steel core plates. This entire assembly, in turn, is mounted inside a pressure vessel with generally hemispherical upper and lower heads. Reactor coolant, introduced into the pressure vessel through inlet nozzles, flows downward in an annular space between the core barrel and the pressure vessel, reverses direction in the lower plenum of the vessel, flows upward through openings in the lower core plate, and through the fuel assemblies where it is heated as a result of the fission reactions before being directed radially out of the pressure vessel through outlet nozzles. The heat extracted by the reactor coolant from the core is utilized to generate electricity thereby lowering the temperature of the reactor coolant which is recirculated through the reactor in a closed loop.

Since the fuel assemblies are square in cross section, an irregular space exists between the periphery of the core and the inner surface of the core barrel. The usual practice is to place longitudinally extending flat, baffle plates along the outer surfaces of the fuel assemblies to confine the upward coolant flow to the fuel assemblies. The baffle plates are held in place by horizontal, irregularly shaped former plates that are bolted to and between the longitudinal baffle plates and the core barrel. Holes in the former plates permit limited coolant flow in the generally annular space between the longitudinal baffle plates and the core barrel to provide cooling for these components and to equalize the pressure on both sides of the longitudinal baffle plates.

Although the original purpose of the vertical baffle plates was to channel reactor coolant flow through the fuel assemblies, it has been recognized that to some extent they also reflect neutrons back towards the peripheral fuel assemblies. However, since these plates are relatively thin, most of the neutrons escaping radially from the core migrate into the large volume of water between the plates and the core barrel which absorbs or thermalizes the neutrons with very little reflection.

Radial reflectors are designed to reflect neutron radiation back into the interior active core region of reactor vessels during power operation to improve the efficiency of the reactors and to protect the reactor vessels from the embrittling affects of years of irradiation during power operation.

With an aging fleet of reactors around the world, there is a current need to extend the life of reactor vessels by more effectively shielding the vessel walls from irradiation to satisfy the requirements for plant licensing extensions. Furthermore, new reactors are being designed with larger and larger cores that will necessitate a more effective shield of the reactor vessel wall to achieve the desired operating life.

Accordingly, it is an object of this invention to provide a radial reflector design that provides improved protection for the reactor vessel walls against radiation that will extend the vessels life.

It is a further object of this invention to provide a new radial reflector design that can economically be back fitted into existing reactors.

Further, it is an additional object of this invention to provide such a radial reflector design that can accommodate ever larger reactor cores with minimum increases in reactor vessel size.

Further, it is an object of this invention to provide a new reactor internal support arrangement that will accommodate the larger internals that will be necessary to support larger reactor cores of the future.

SUMMARY OF THE INVENTION

These and other objects are achieved by this invention which provides a nuclear reactor lower internals arrangement having an axial and circumferential dimension. The lower internals arrangement includes a tubular core barrel supported coaxially within the lower internals and having an inside surface and an upper and lower end. A reflector is supported within the tubular core barrel and has an outside curvature that substantially matches a curvature of the inside surface of the core barrel and contacts a substantial portion of the inside surface substantially over an axial length of the core barrel that extends substantially from the lower end to the upper end. The reflector further has an inside contour that matches an outside contour of an array of a plurality of nuclear fuel assemblies that are designed to be supported within the core barrel to form a nuclear core. The reflector is fixedly connected to the inside surface of the core barrel at a plurality of axial and circumferential locations so that the reflector is substantially supported by the inside surface of the core barrel.

In one embodiment, the reflector does not extend continuously around the circumferential dimension, but is provided in circumferential sections, preferably that mate with a stepped interface formed from alternating angles wherein adjacent alternating angles are bent in opposite directions. Preferably, the alternating angles are substantially right angles.

In one embodiment, at least two of the circumferential sections are spaced from each other and are separated by a baffle and former structure. Desirably, the reflector does not extend substantially continuously from the lower end to the upper end of the core barrel and is divided into axial sections that interface with each other at an acute angle with the inside surface of the core barrel. Preferably, the acute angle is 30°. Desirably, the number of axial sections is either three or four and a space is provided between interfacing axial sections. In the embodiment wherein at least two of the circumferential sections are spaced from each other and are separated by a baffle-former structure, a former plate is positioned to cover substantially each circumferential end of the interface of the axial sections.

In still another embodiment, the radial reflector includes a plurality of axially extending coolant channels between the outside curvature of the reflector and the inside curvature of the core barrel. Desirably, there are axial coolant channels within the radial reflector that extend between axial sections and include tubular sleeves inserted and closely received within at least some of the coolant channels in the vicinity of the interface between axial sections that span the interface.

In another embodiment, the core barrel is attached to the reactor vessel at a plurality of spaced, circumferential locations by a plurality of attachment bracket arrangements that maintain a space between the reactor vessel and the outside of the core barrel. At least two of the attachment bracket arrangements are positioned circumferentially around and affixed to an outside surface of the core barrel at substantially different axial elevations. Desirably, adjacent attachment bracket arrangements are positioned at the substantially different axial elevations and the space between the reactor vessel and the inside of the core barrel forms a coolant path wherein the substantially different axial elevations are longitudinally spaced far enough apart so that the coolant blocked by one of the attachment bracket arrangements at an upper elevation is reformed directly below the one of the attached bracket arrangements before the coolant reaches a lower axial elevation of the next attachment bracket arrangement at the substantially different axial elevation.

In another embodiment, the nuclear reactor lower internals structure includes a specimen basket formed from a hollowed out portion of the reflector. Desirably, the hollowed out portion extends from a top surface of the reflector.

BRIEF DESCRIPTION OF THE DRAWINGS

A further understanding of the invention can be gained from the following description of the preferred embodiments when read in conjunction with the accompanying drawings in which.

Figure 5:
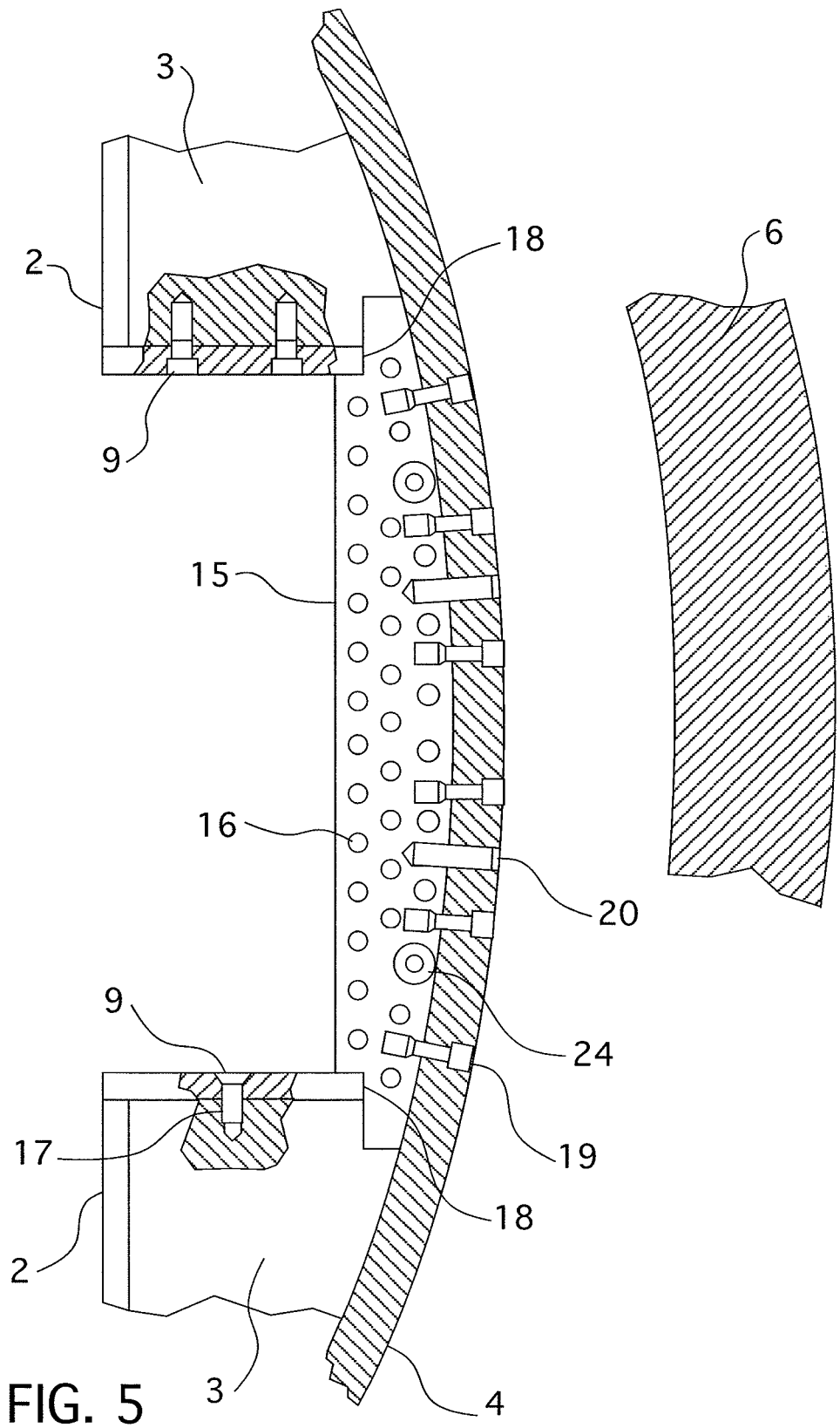
FIG. 5 is a plan view, partially in section, of a partial core radial reflector of one embodiment of this invention intended for either a two or three-loop nuclear plant.
Figure 8:
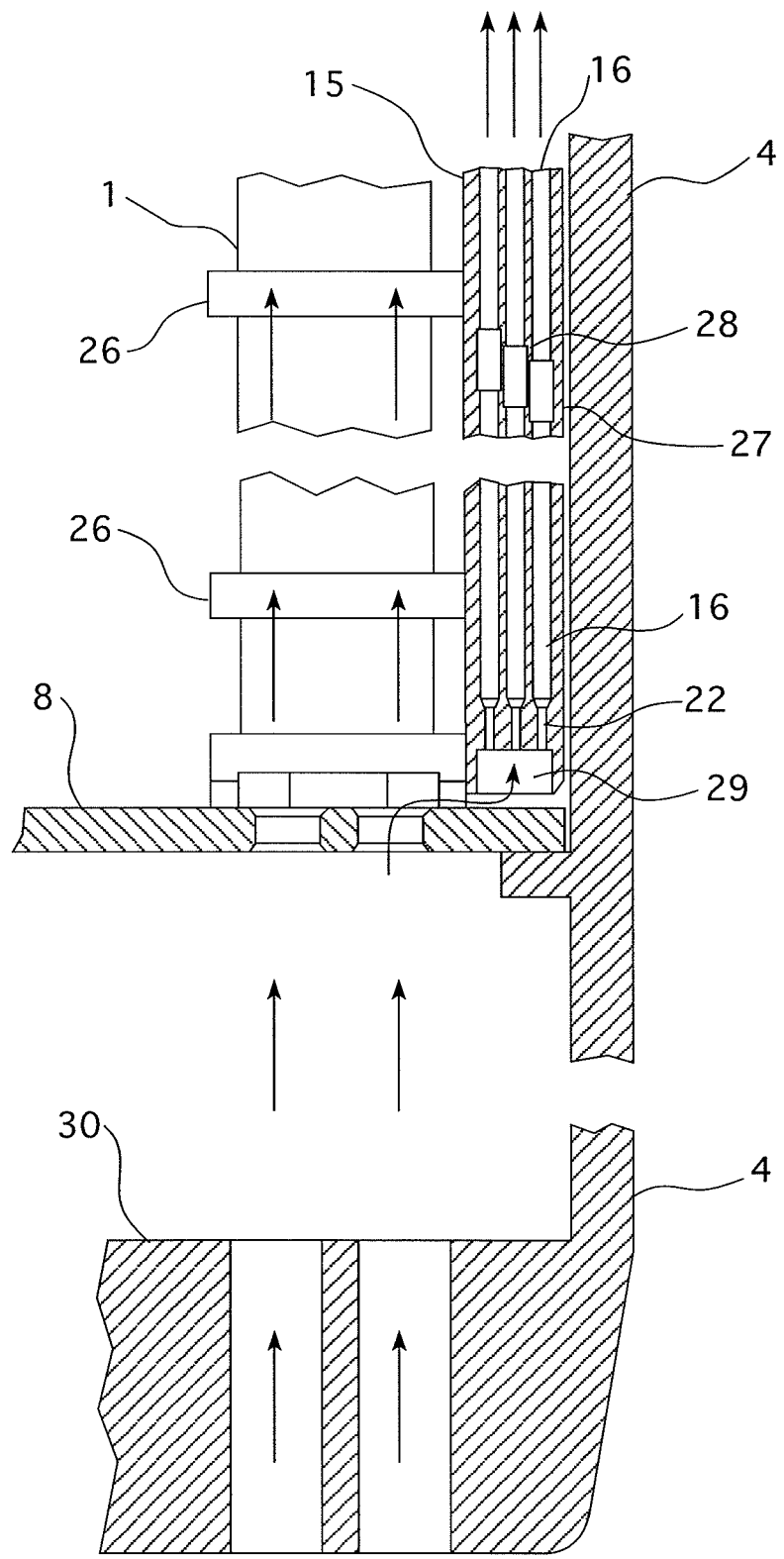
Figure 9:
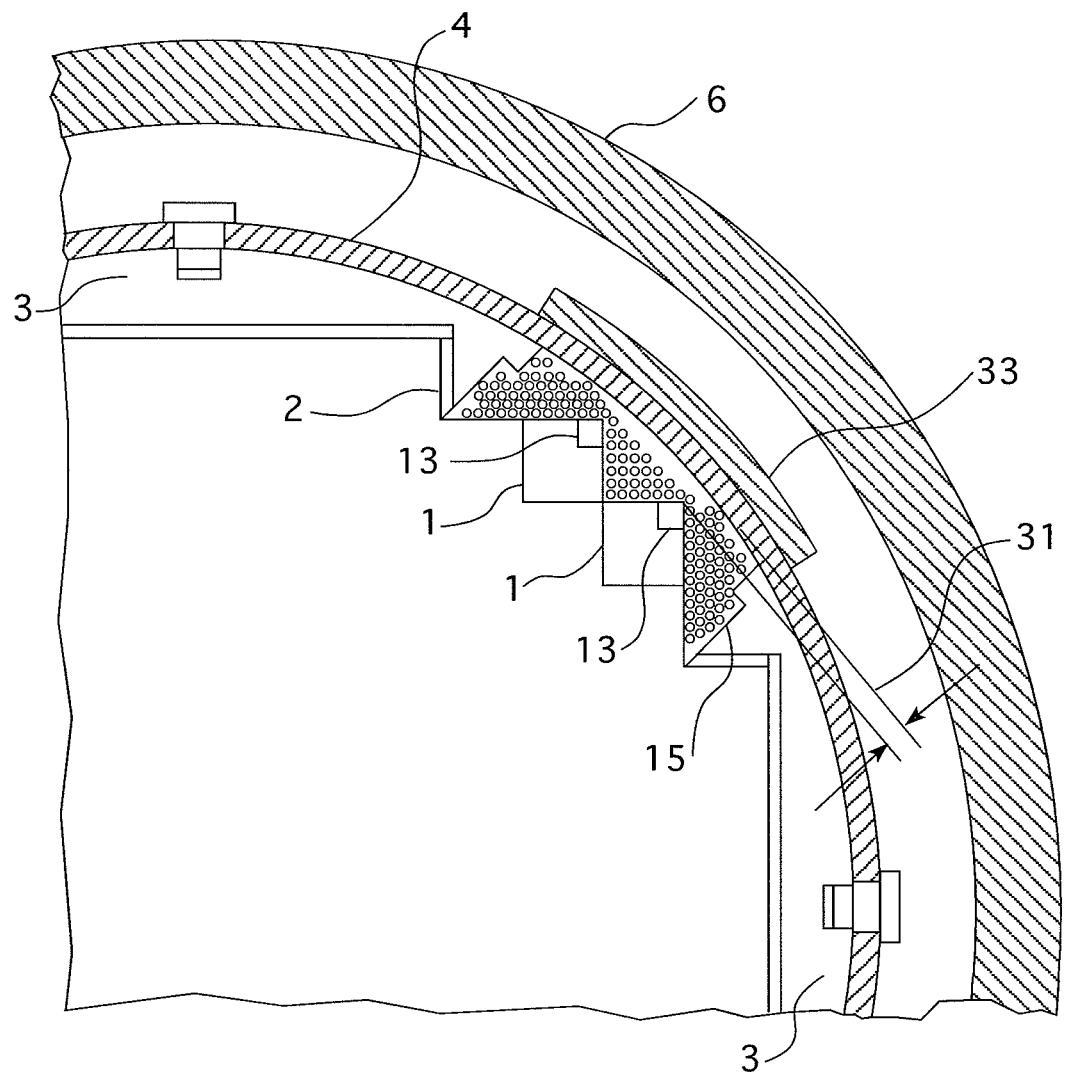
Figure 10B:
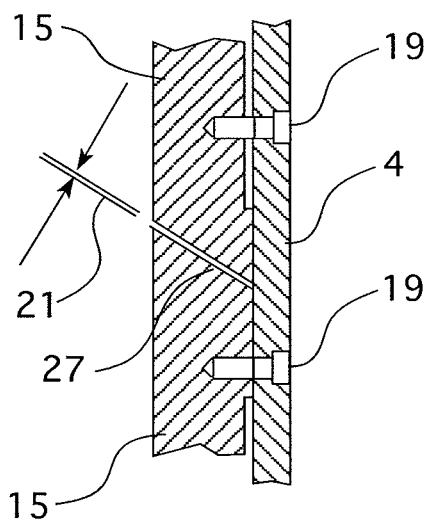
Figure 10C:
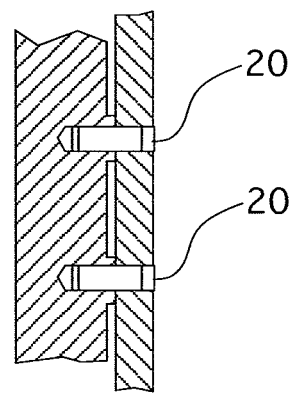
Figure 10A:
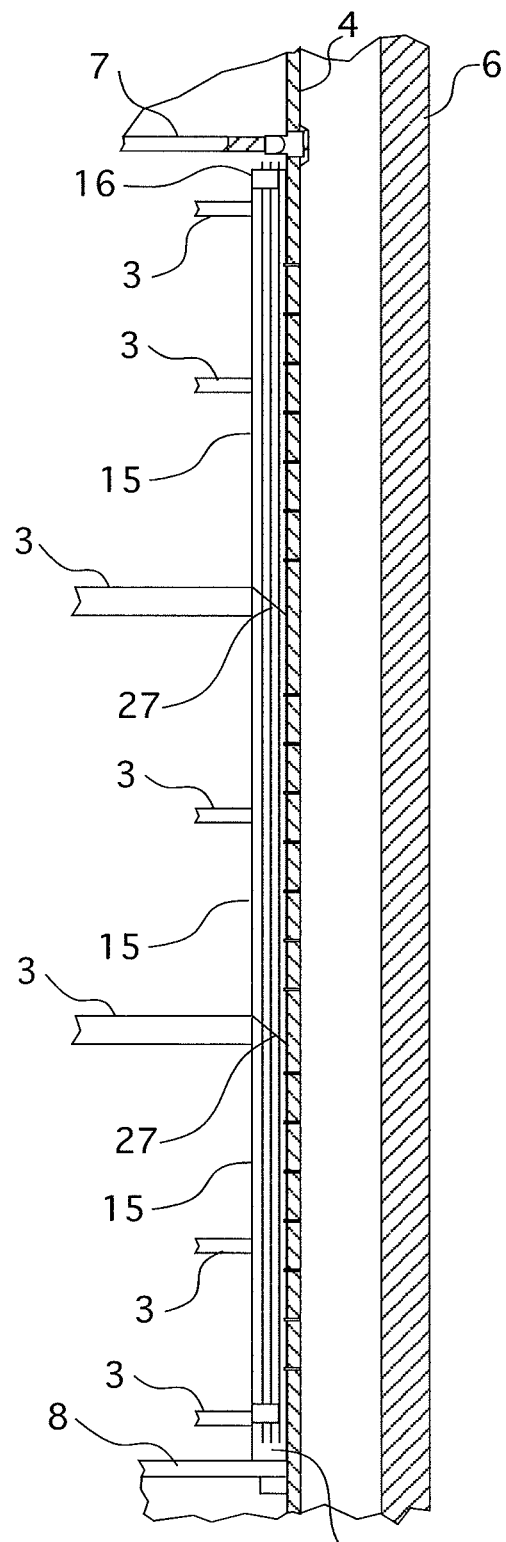
Figure 11A:
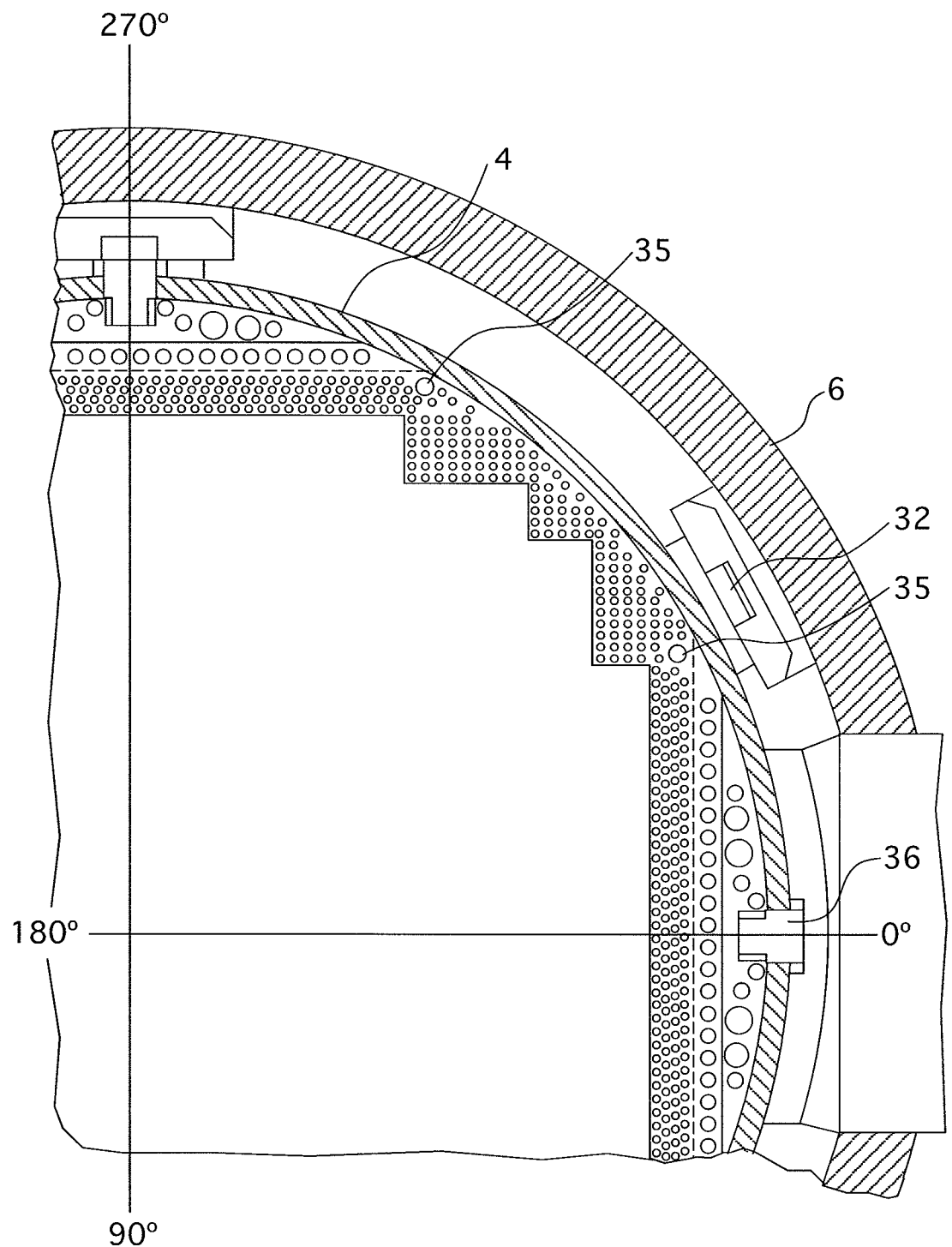
Figure 11B:
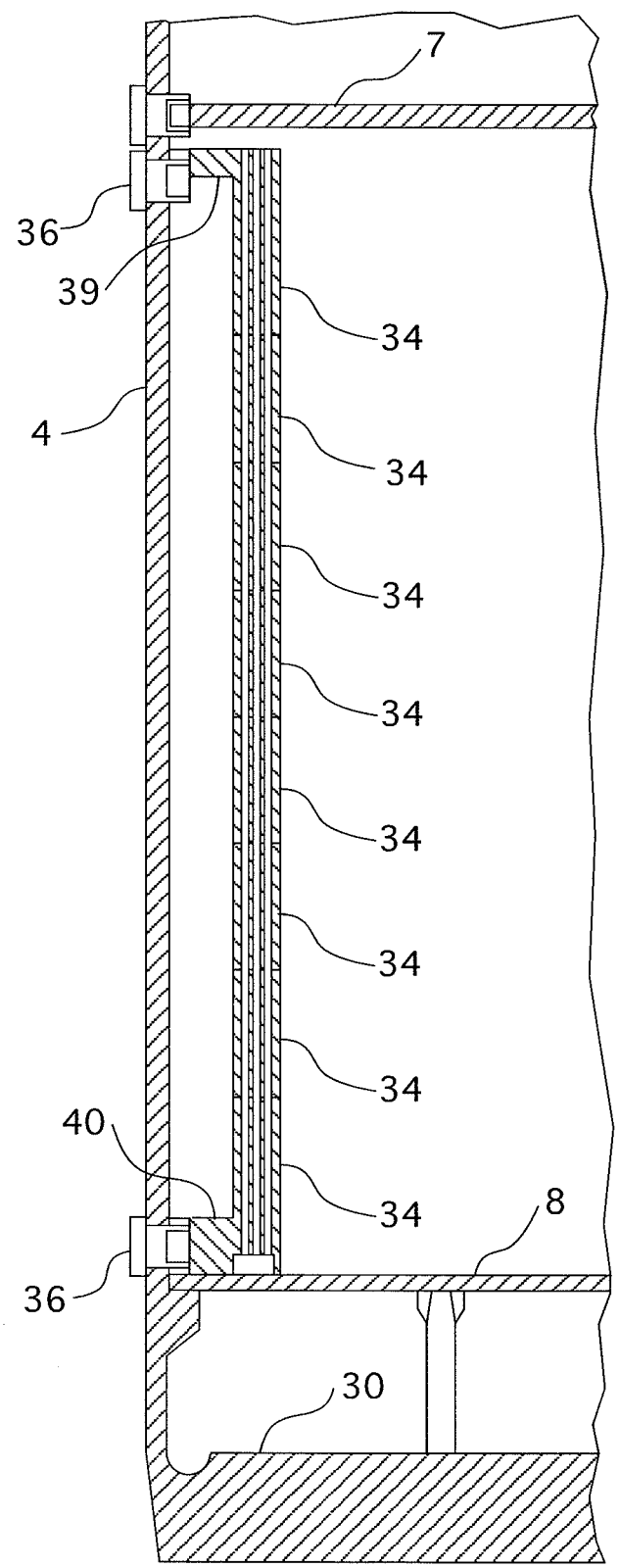
Figure 11C:
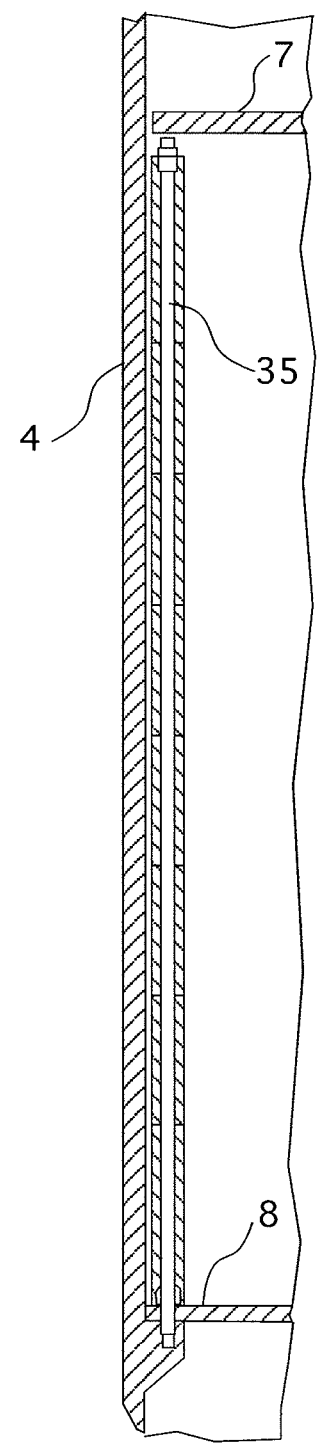
Figure 12:
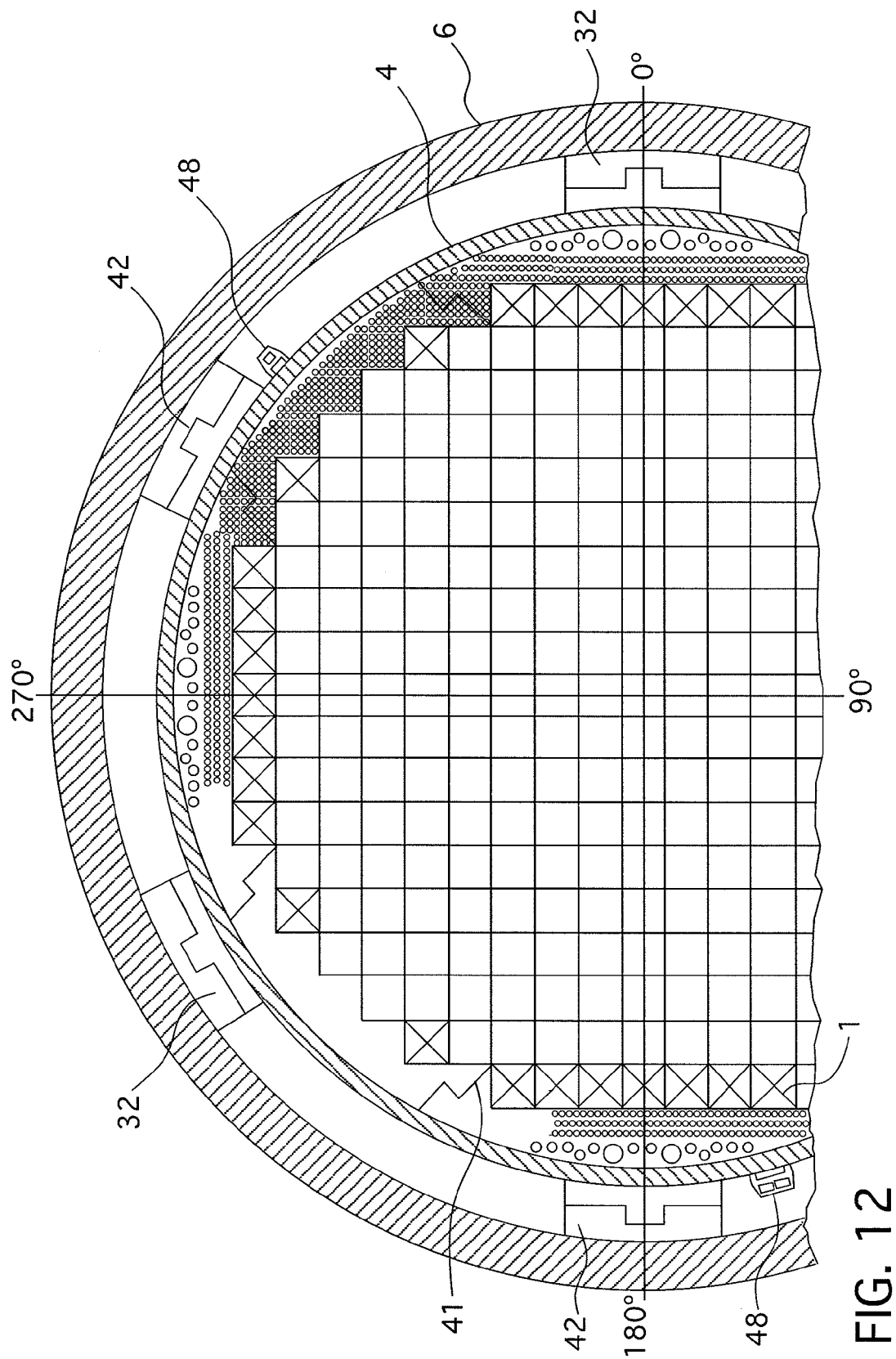
Figure 13:
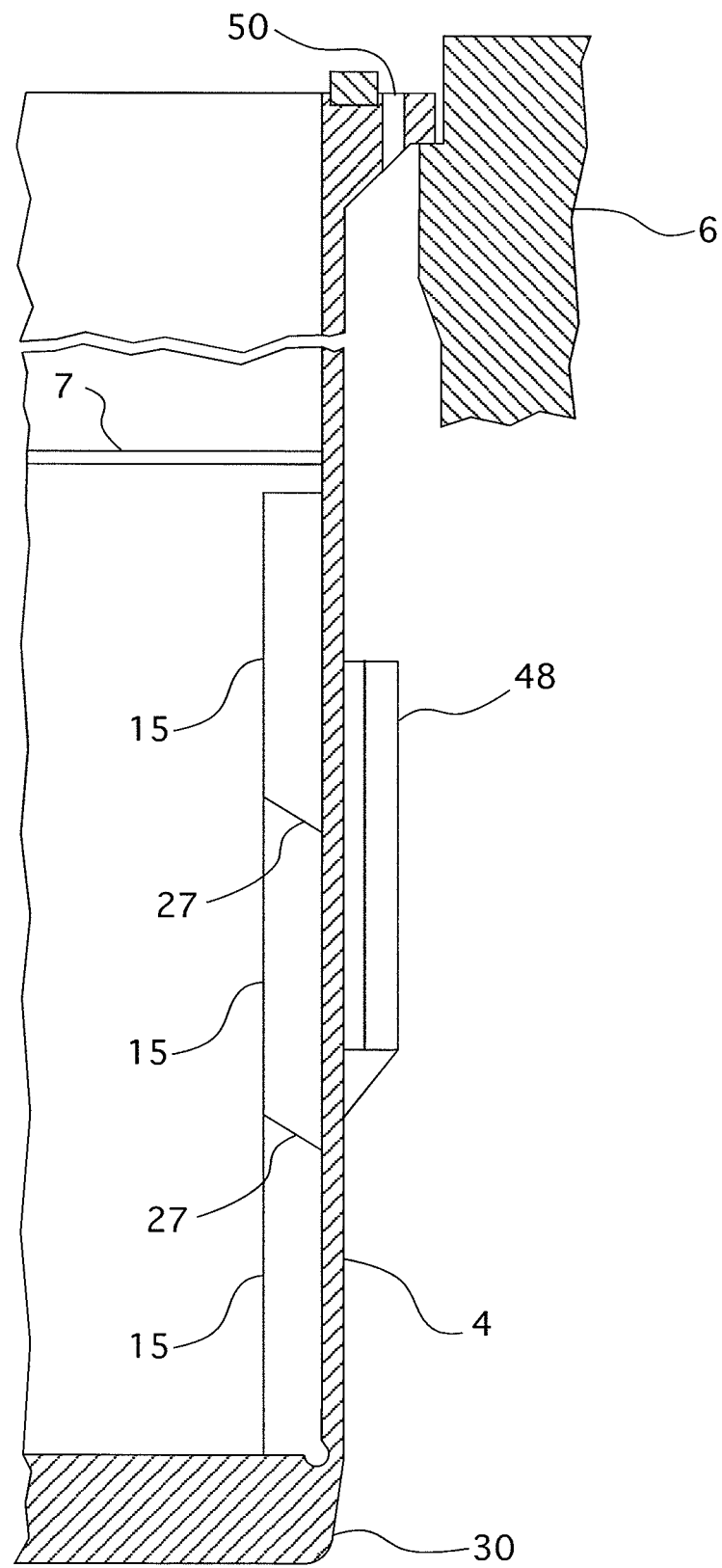
Figure 14A:
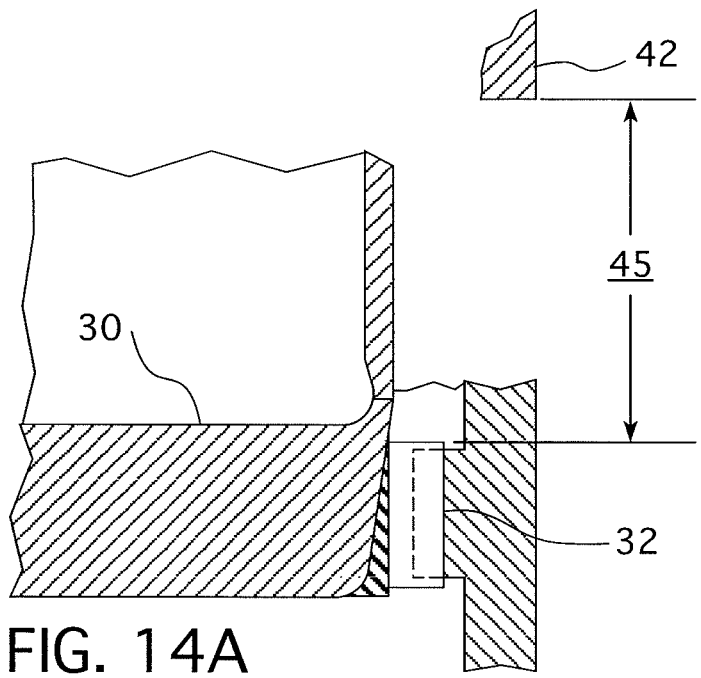
Figure 14B:
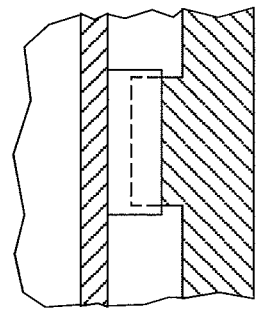
Figure 14C:
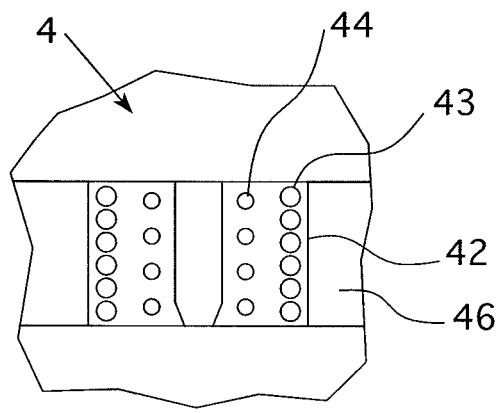
Figure 14D:
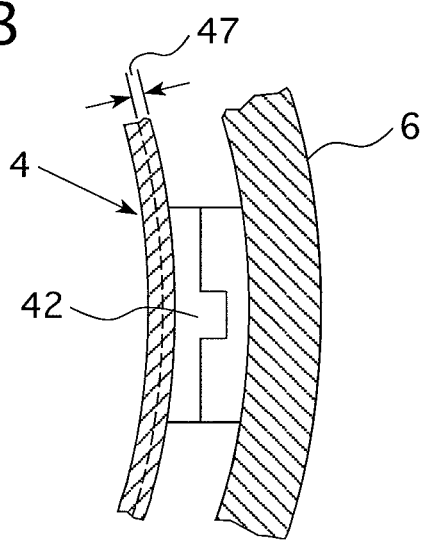
Figure 15:
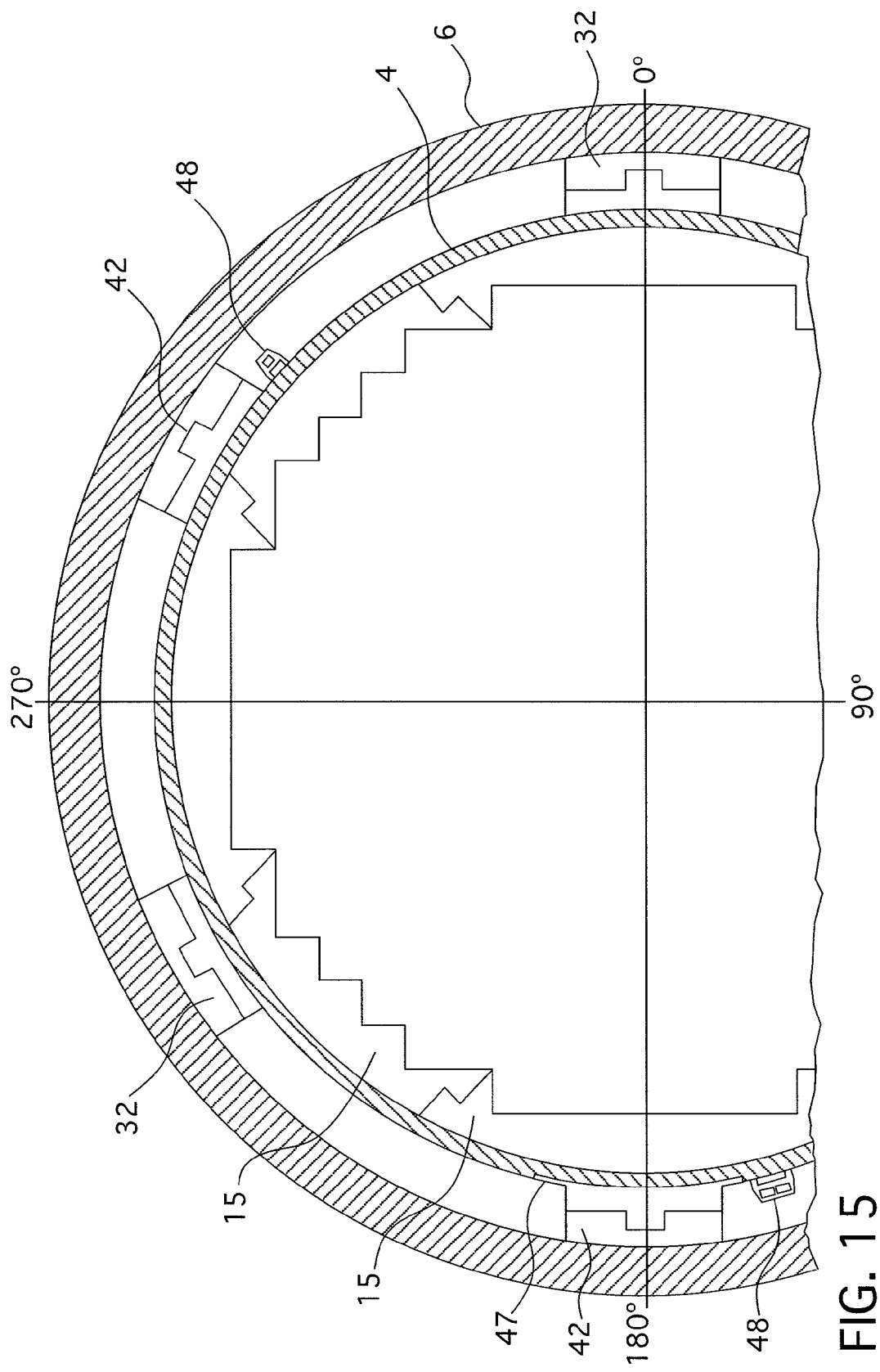
Figure 16:
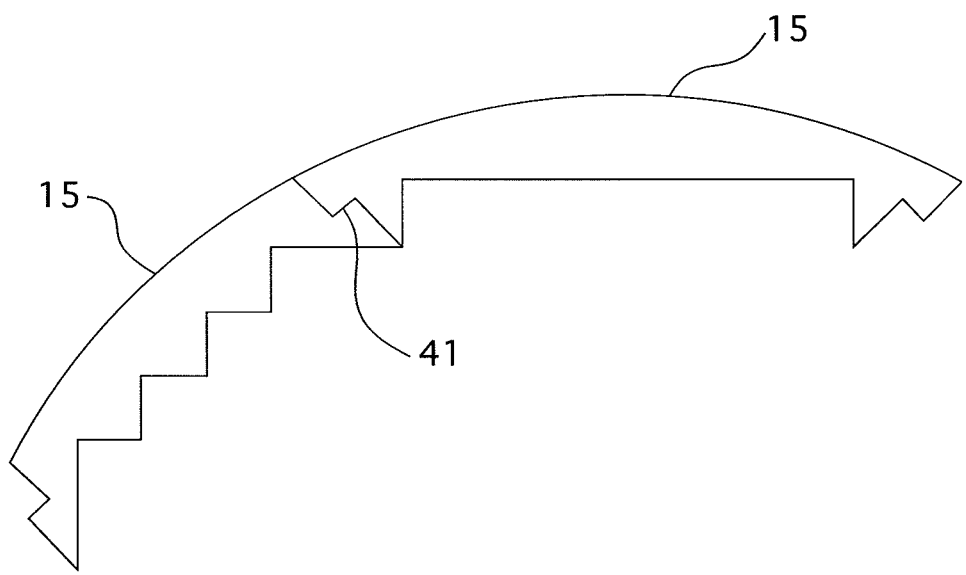
Figure 17:
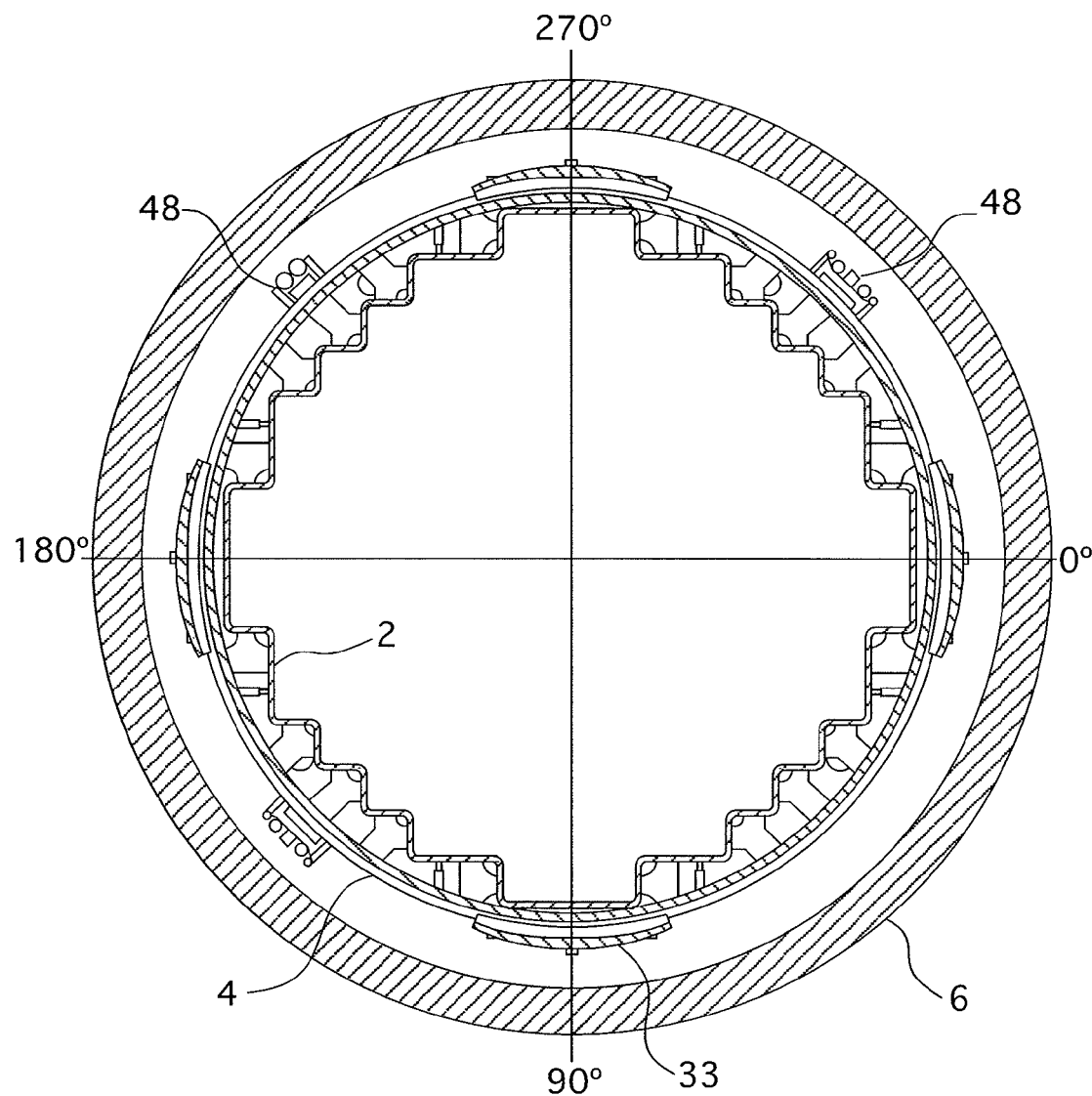
Figure 18:
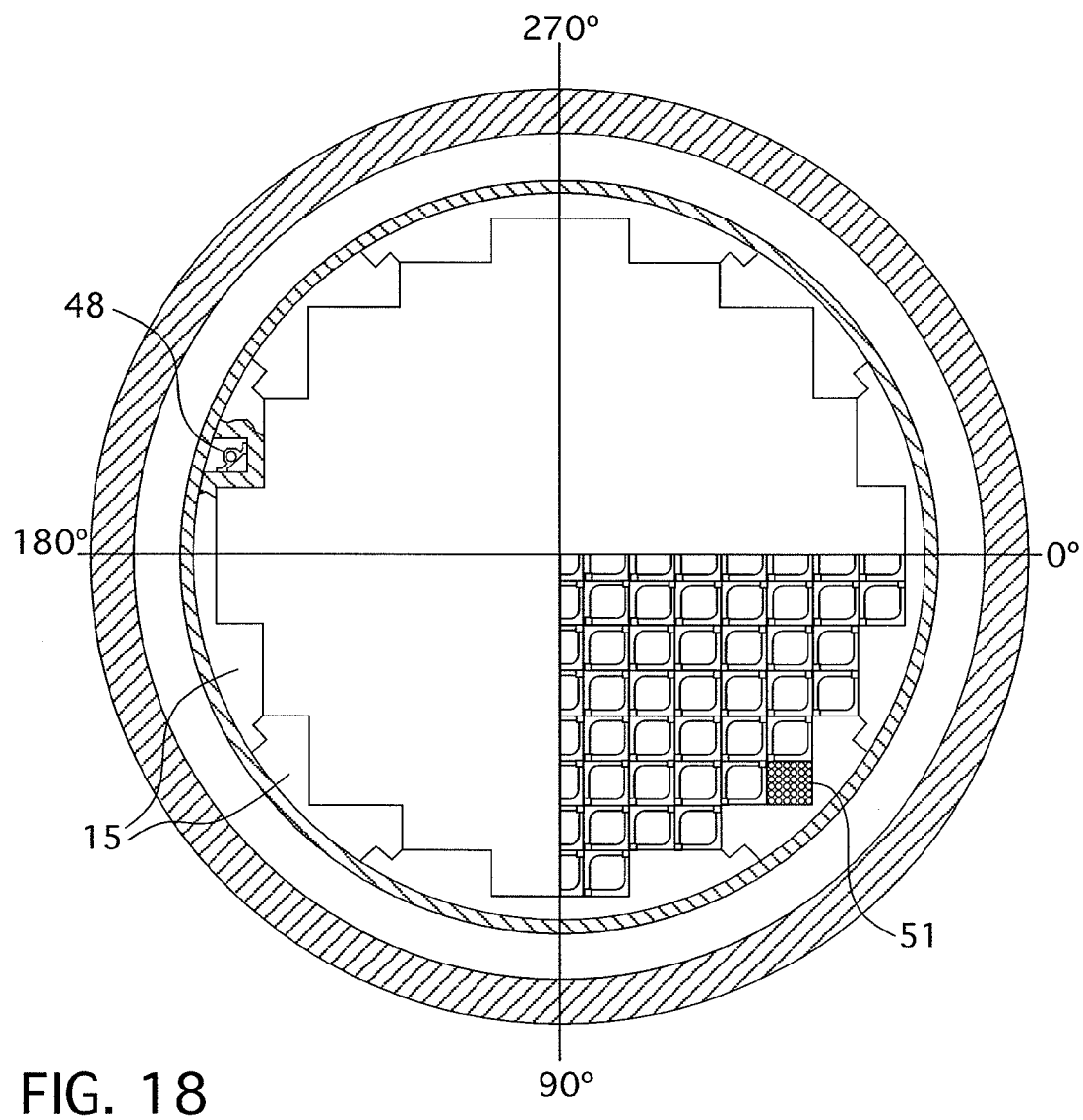

FIG. (7A) is a sectional view of a portion of the radial reflector illustrated in FIG. 5 that shows the flow sleeve arrangement between axial reflector sections;

FIG. 7B is a plan view, partially in section, of the partial radial reflector of FIG. 5 illustrating the positioning dowels employed to align the axial sections;

FIG. 8 is an elevational sectional view of a lower portion of the internals that shows the coolant flow path into the partial radial reflector shown in FIG. 5;

FIG. 9 is a plan view, partially in section, of another embodiment of the partial reflector of this invention intended for a four-loop nuclear plant;

FIG. 10A is a side elevational view, partially in section, of the radial reflector shown in FIG. 9 showing the position of the former plates at the interface between axial reflector sections;

FIG. 10B is an enlarged view of the connection between the core barrel and the reflector axial sections;

FIG. 10C is a sectional view of the dowel interface between the core barrel and a reflector axial segment;

FIG. 11A is a plan view, partially in section, of a prior art radial reflector;

FIG. 11B is a side elevational view, partially in section, of the reflector illustrated in FIG. 11A taken along the lines A-A thereof;

FIG. 11C is a sectional elevational view of the prior art reflector shown in FIG. 11A taken along the lines B-B thereof;

FIG. 12 is a plan view, partially in section, of a radial reflector in accordance with this invention, for a 293 fuel assemblies core;

FIG. 13 is an elevational view, partially in section, of the radial reflector shown in FIG. 12;

FIG. 14A is a sectional view of the saddle and key connection of the lower core barrel to the reactor vessel at the elevation of the lower core plate;

FIG. 14B is a sectional view of the saddle and key connection between the core barrel and the reactor vessel at an elevation substantially above the lower core plate;

FIG. 14C is a schematic view of the connection of the key attachment within a circumferential channel on the outer surface of the core barrel;

FIG. 14D is a plan view, partially in section, of the key and saddle connection between the core barrel and the reactor vessel;

FIG. 15 is a plan view, partially in section, of a lower radial support arrangement of this invention for a 293 fuel assemblies core;

FIG. 16 is a schematic view of a circumferential section of a core reflector segment of this invention for a 293 fuel assemblies core;

FIG. 17 is a plan view, partially in section, of a prior art 157 fuel assemblies fully welded, core baffle enclosure; and FIG. 18 is a plan view, partially in section, of a full reflector arrangement in accordance with this invention for 157 fuel assemblies core.

DESCRIPTION OF THE PREFERRED EMBODIMENT

Figure 1:
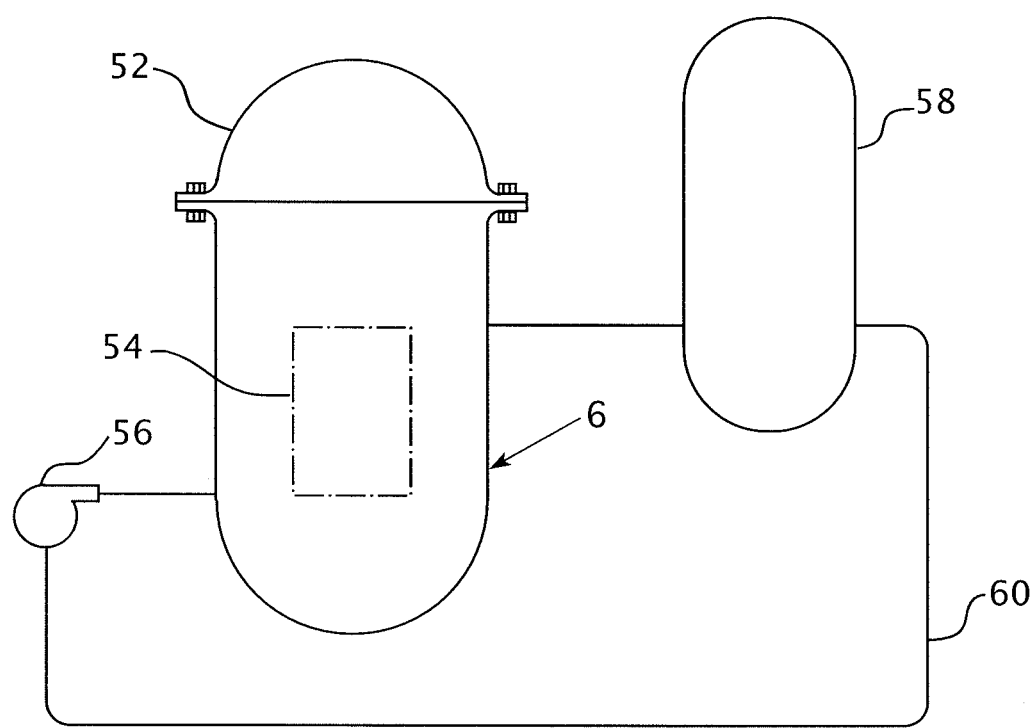
FIG. 1 is a simplified schematic of a nuclear reactor system to which this invention may be applied.

Referring now to the drawings, FIG. 1 shows a simplified nuclear reactor primary system, including a generally cylindrical reactor pressure vessel 6 having a closure head 52 enclosing a nuclear core 54. A liquid reactor coolant, such as water, is pumped into the vessel 6 by the pump 56 through the core 54 where heat energy is absorbed and is discharged to a heat exchanger 58 typically referred to as a steam generator, in which heat is transferred to a utilization circuit (not shown) such as a steam driven turbine generator. The reactor coolant is then returned to the pump 56, completing the primary loop.

Typically, a plurality of the above described loops are connected to a single reactor vessel 6 by the reactor coolant piping 60.

Figure 2:
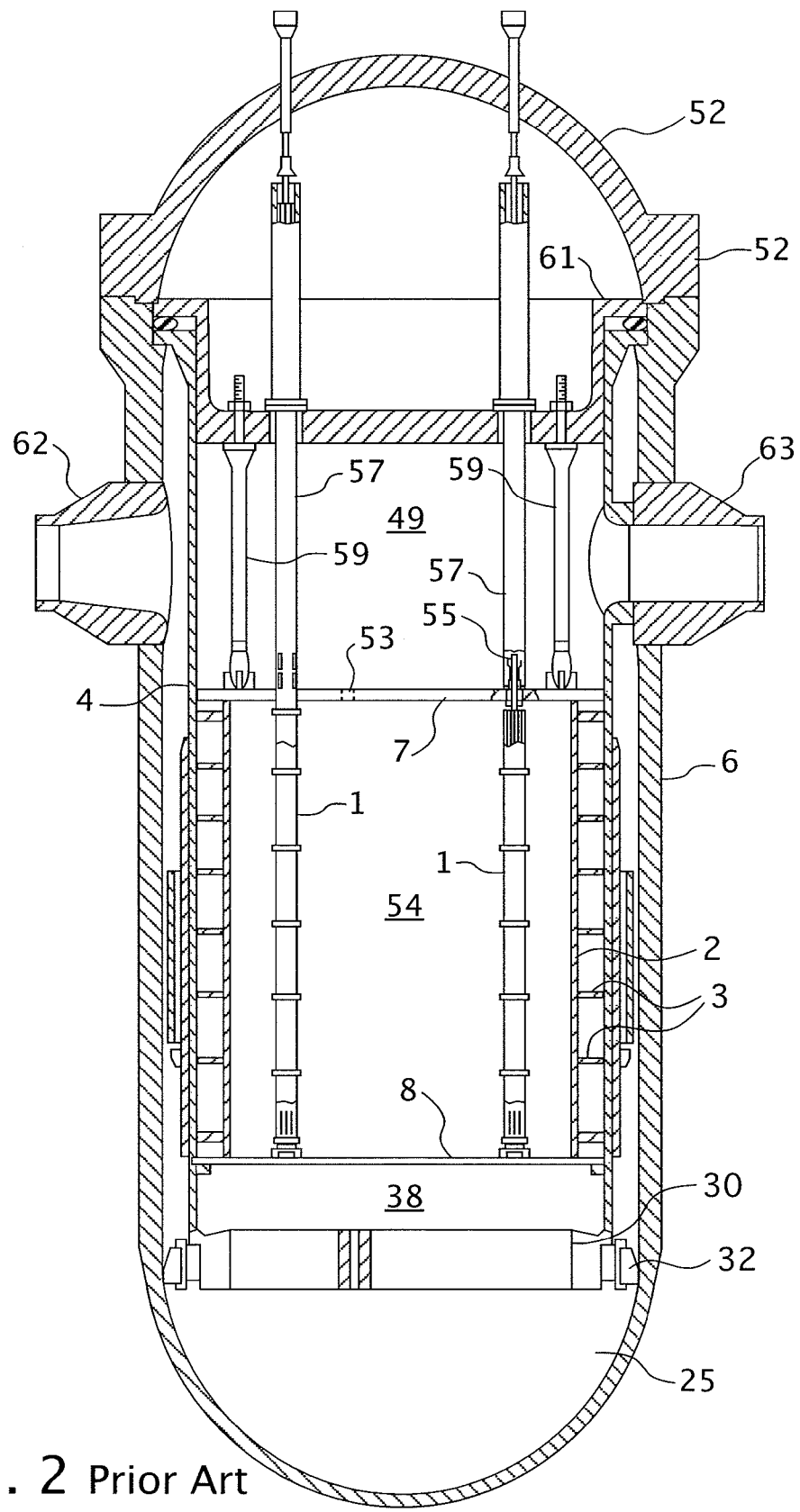
FIG. 2 is an elevational view, partially in section, of a nuclear reactor vessel and internal components of a typical pressurized water reactor.
Figure 3:
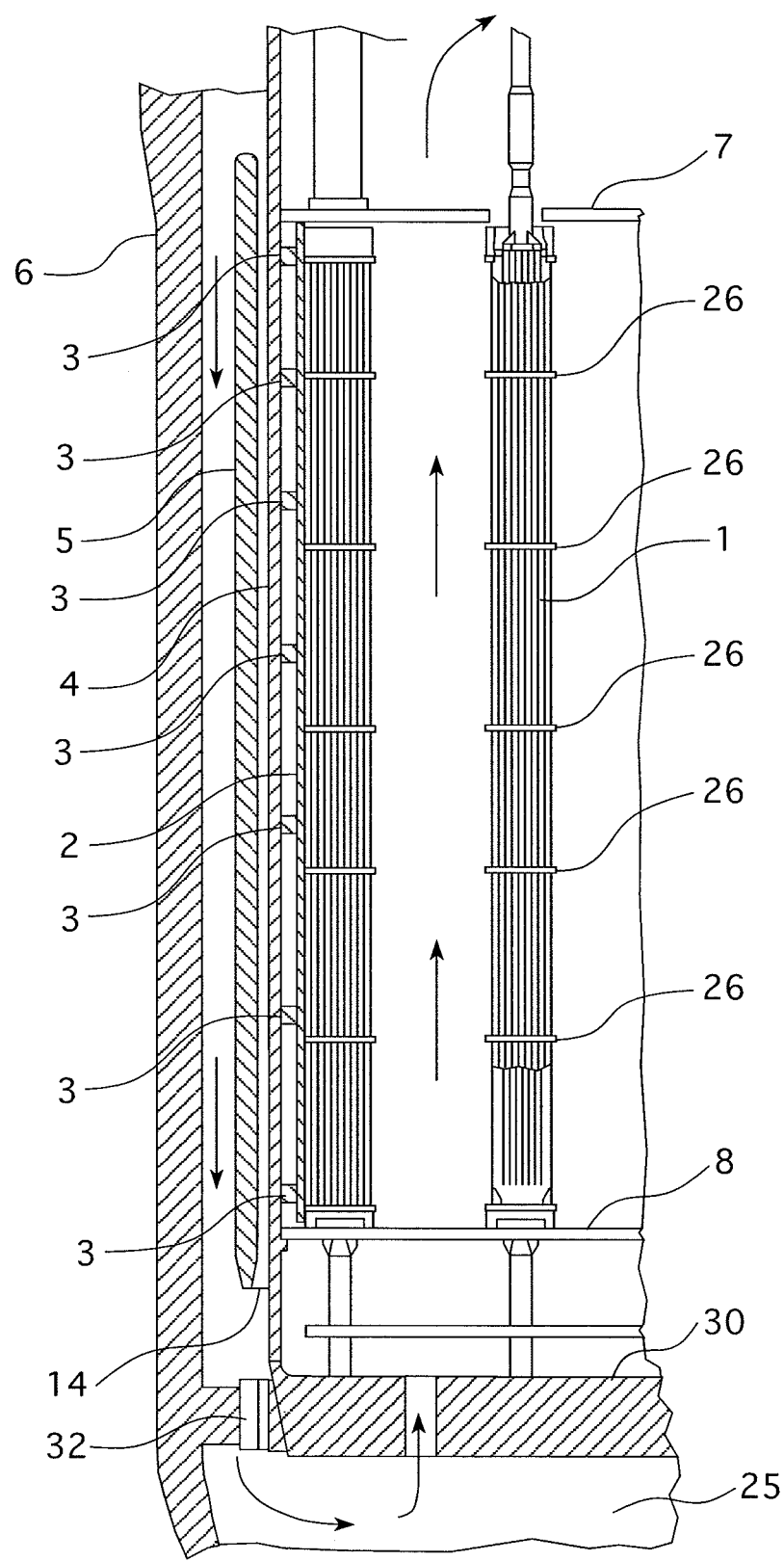
FIG. 3 is an enlarged elevational view of a portion of the lower internals of a prior art pressurized water reactor showing a portion of the core, internals and pressure vessel.
Figures 4, 4A, 4B:
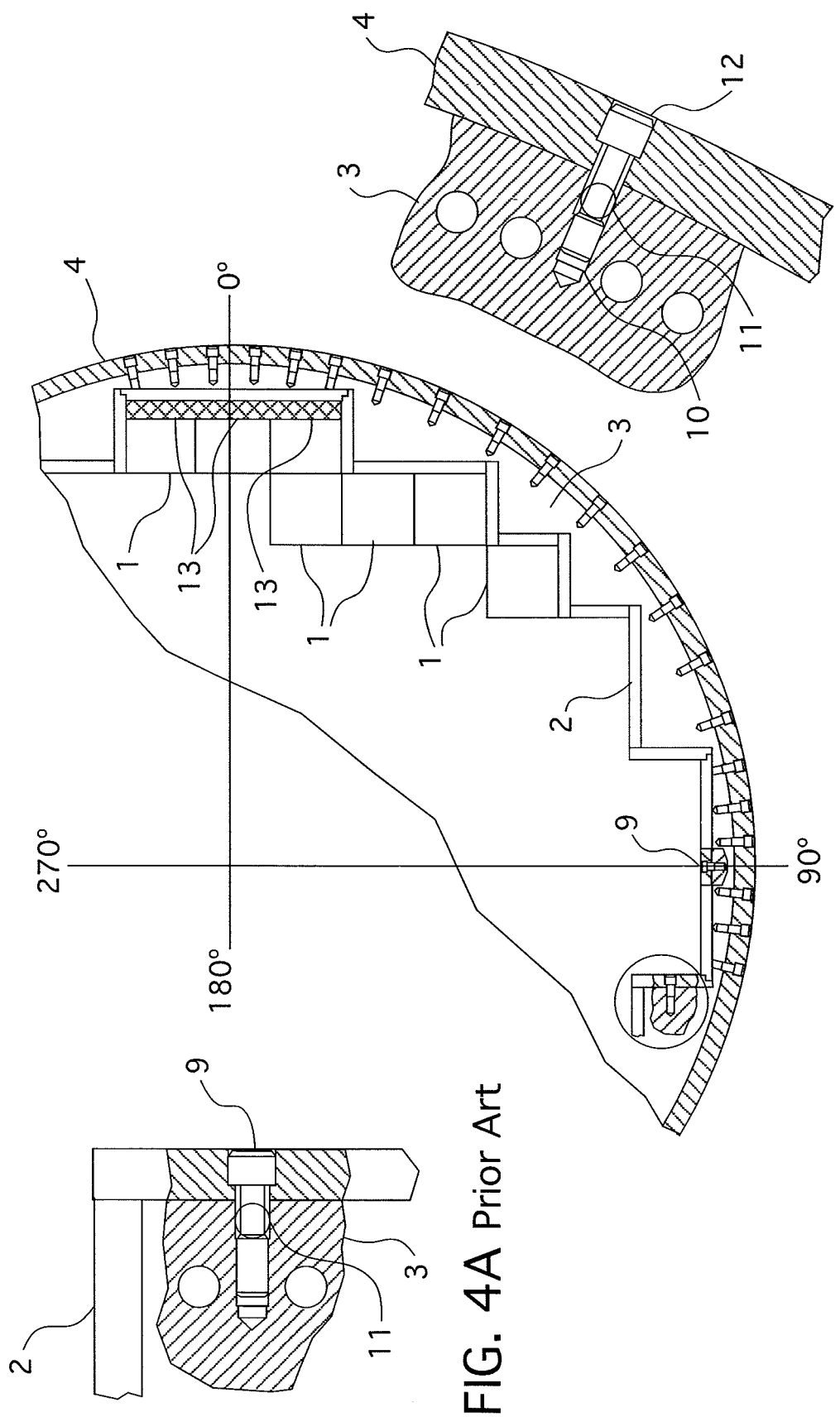
FIG. 4 is a plan view of a prior art baffle and former arrangement.
FIG. 4A is an enlarged plan view, partially in section, showing the connection between a baffle and former.
FIG. 4B is a plan view, in section, of a connection between the core barrel and a former plate.

A conventional reactor design is shown in more detail in FIGS. 2, 3 and 4. In addition to the core 54 comprised of the plurality of parallel, vertical, co-extending fuel assemblies 1, for purposes of this description, the other vessel internal structures can be divided into the lower internals 38 and the upper internals 49. In conventional designs, the lower internals function to support, align and guide core components and instrumentation, as well as to direct flow within the vessel. The upper internals restrain or provide a secondary restraint for the fuel assemblies 1 (only two of which are shown for simplicity in FIGS. 2 and 3), and support and guide instrumentation and components such as control rods.

In the exemplary reactor shown in FIGS. 2 and 3, coolant enters the vessel 6 (also designated by reference character 6 in FIG. 3 et seq.) through one or more inlet nozzles 62, flows downward about a core barrel 4, is turned 180° in a lower plenum 25, passes upwardly through a lower core support plate 8 upon which the fuel assemblies 1 are seated, and through and about the assemblies. The coolant flow through the core and surrounding area is typically large, in the order of 400,000 gallons per minute (25.24 m$^3$/s) at a velocity of approximately 20 feet per second (6.1 m/s). The resulting pressure drop and frictional forces tend to cause the fuel assemblies to rise, which arrangement is restrained by the upper internals 49, including a circular upper core plate 7. Coolant exiting the core 54 flows along the underside of the upper core plate 7 and upwardly through a plurality of perforations 53. The coolant then flows upwardly and radially to one or more outlet nozzles 63.

The upper internals 49 can be supported from the reactor or vessel head 52 and include an upper support assembly 61. Loads are transmitted between the upper support plate 61 and the upper core plate 7 primarily by a plurality of support columns 59. A support column is aligned above a selected fuel assembly 1 and perforations 53 in the upper core plate 7.

Rectilinearly moveable control rods typically including a drive shaft 55 and a spider assembly of neutron absorbing rods are guided through the upper internals 49 and into aligned fuel assemblies 1 by the control rod guide tubes 57. The guide tubes 57 are fixedly joined to the upper support assembly 61 and connected by a split pin force fit into the top of the upper core plate 7.

Currently, the core is typically enclosed by a series of vertical baffle plates 2 attached to horizontal former plates 3 that are connected between the baffle plates 2 and the reactor vessel core barrel 4 as can be seen in FIGS. 2 and 3, though there is a slight difference in the number of formers shown between the two figures, which is, in part, dependent upon the height of the core. FIG. 3 depicts an elevational view of a typical pressure vessel 6 enclosing the baffle/former/fuel assembly elements 2, 3, 1 and also showing the upper core plate 7, lower core plate 8, cylindrical thermal shield 5 and lower core support plate 30.

FIG. 4 illustrates a partial plan view that provides a better appreciation of the baffle plates 2, former plates 3 and fasteners 9 and 12 which, respectively, attach the baffle plates to the former plates and the former plates to the core barrel as can be seen, respectively, in FIGS. 4A and 4B. As can be appreciated in FIGS. 2 and 3, there are typically between seven and eight levels of former plates 3. A typical threaded hole, as seen at 10 in FIG. 4B, receives the threaded fastener 12 which affixes the former plates 3 to the core barrel 4. A cooling hole 11, drilled vertically through the former 3, bisects the horizontal through hole in the former 3, provided for the bolt 12. Coolant flowing through the hole 11 reduces the temperature of the bolt during plant operation, thereby prolonging its operating life. As can be seen from FIG. 4, the perimeter of the core is a stepped (staircase) pattern, which is the classic design and will continue to be the "core enclosure geometry," in newly designed pressurized water reactors, as radial core reflector designs replace the classical standard baffle/former/thermal shield concept to accommodate larger cores and enhanced operating life for the plant. This invention provides both (i) a partial core reflector design that combines with the conventional baffle/former design to provide a complete core enclosure and (ii) a full core reflector design.

Partial Radial Reflector

A partial radial reflector is particularly suited for reactor internals of the two and three-loop design, i.e., approximately 450 Mwe and 750 Mwe. Reactor internals replacement for aging nuclear plants is driven by several factors. Most pressing is baffles/former bolt 9 replacement because of material aging and the desire of the utilities to obtain plant license extensions, which has to take into consideration the "swelling" of core components, in addition to the other factors of irradiation assisted stress corrosion cracking and creep, to obtain regulatory approval for an additional 20 to 25 years of plant operation. The second factor is the fast neutron dose rate on the pressure vessel inside diameter, and more particularly, the vessel girth and longitudinal welds which reside in the high flux zones, which could cause metal embrittlement and possible cracking, i.e., pressurized thermal shock, in the event of cold, emergency core cooling water being injected during an accident scenario. Several plants are currently operating with "suppressors" 13 in the outer row/s of fuel rods, as shown in FIG. 4, in the core peripheral fuel assemblies to minimize the fast neutron count on the pressure vessel 6. The suppressors are hafnium or stainless steel rods that are substituted for fuel bearing rods. If a "suppressor" strategy is chosen, the utility sacrifices some power output and the ability to use an "out-in-out" fuel assembly refueling rotation schedule, which is the most economical plan. Another driver for reactor internals replacement is to include injection of inlet coolant water into the pressure vessel head plenum. A cooler body of water in this area improves the safety of the pressure vessel head penetration welds and increases the margin of safety for a loss of coolant accident, at which time this water dumps into the core.

The thermal shield 5 is designed to mitigate fast neutron attrition on the pressure vessel 6 but is not nearly as effective as a radial core reflector which places the metal closer to fuel and thus causes neutrons to be "reflected" back into the core. The partial radial reflector of this invention shelters the pressure vessel more effectively and contributes to a percentage of increased fuel utilization, approximately 3% for a full radial core reflector. Several other reactor internals modifications that utility customers desire, besides the above, brings one to the realization that replacing the reactor internals can be more cost effective than making all these modifications piecemeal. For example, one three-loop plant, several years ago, replaced 280 of the 1,088 baffle/former bolts at a cost of approximately $17 million along with a plant critical path outage of approximately 32 days. To replace the remaining 808 bolts would require another three outages of similar duration and cost. ALARA considerations also add intangible costs when choosing the bolt replacement path. ALARA is an acronym that stands for "as low as reasonably achievable" and refers to minimizing radiation exposure.

Although a full circumferential radial core reflector, such as the one disclosed hereafter is feasible, it is more expensive than a partial radial reflector which is an effective alternative when considering reactor internals replacement for a two-loop and three-loop plant. Existing plants have concerns over the number and duration of plant outages that inspection, repairs, and a baffle bolt replacement will require with a license extension from 32 to 54 Effective Full Power Years (EFPY). Perhaps even more critical is the added fast neutron flux dosage on the pressure vessel that will be incurred as a result of a plant life extension, that is now being marginally abated by the fuel assembly suppressor rods 13 shown in FIG. 4.

It is well known in the nuclear industry that due to the core geometry and mass of fuel proximity to the pressure vessel inside diameter, the fast fluence on the cardinal axes (i.e., 0°, 90°, 180° and 270°) of the core is twice of that on the 45°, 135°, 225° and 315° axes for two and three-loop plants. Therefore, placing a partial radial reflector element on each cardinal axis will reduce the neutrons reaching the pressure vessel to the extent that, by end of life (54 EFPY), the accumulation on the pressure vessel walls for the axes designations noted above, will be approximately equal, and no more than the total of $1 \times 10^{20}$ n/cm² now being mandated, which is the limit for which the pressure vessel material fracture properties are known.

A partial radial reflector 15, in accordance with this invention, is shown in FIG. 5 in relation to the core barrel 6, former plates 3 and baffle plates 2 and achieves the goal of an acceptable fluence rate on the pressure vessel after 54 EFPY, and perhaps beyond. The partial radial reflector eliminates all the baffle/former bolts in the most highly irradiated segment of the core, where irradiation assisted stress corrosion cracking and also "swelling" is of more concern. Employing the partial radial reflector 15 the utility can eliminate "suppressor" rods 13 in their twelve peripheral fuel assemblies, recovering that lost power, and also enabling a return to the more economical "out-in-out" fuel rotation plan. The massive cylindrical thermal shields 5, shown in FIGS. 2 and 3, is also eliminated along with the flexures 14, shown in FIG. 3, which connect the thermal shield to the core barrel 4. These flexures (there are six, each about six inches wide), are candidates for fatigue failure with the additional cycles plant life extension brings. Pressure drop reduction is another advantage that can be achieved with the thermal shield and flexures removed. Additionally, the partial radial reflectors stiffen the lower core barrels 4, lowering the lower internals beam mode natural frequency, which is desirable. The partial radial reflector will also increase fuel utilization by approximately 1%. This equates to about 7 Mwe in the case of a three-loop plant. The presence of the partial radial reflectors will also affect the fuel assembly power curve, resulting in more safety margin during a loss of coolant accident event.

Figures 6A, 6B, 6C:
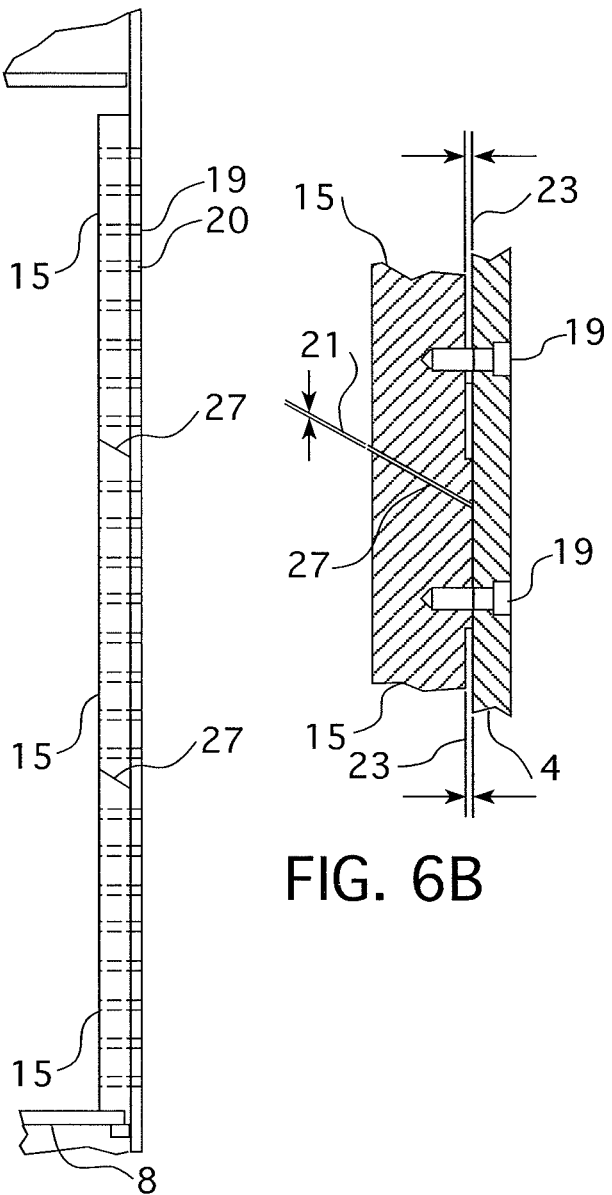
FIG. 6A is an elevational view of the partial radial reflector shown in FIG. 5.
FIG. 6B is an enlarged portion of FIG. 6A around the interface between axial radial reflector sections that shows the acute angled interface between sections.
FIG. 6C is a rear view of the radial reflector shown in FIG. 5 that illustrates the bolting and dowel pattern connecting the radial reflector to the core barrel.

Each partial radial reflector 15, shown in FIG. 5 attached to the core barrel 4, spans for example, approximately 31° of arc, accounting for a total of about 124 feet (37.8 m) of the circumference. The elevation view shown in FIG. 6A illustrates three tiers of the partial radial reflector 15 at each cardinal axis for a total of 12 tiers per core. The partial radial reflector tiers are attached to the core barrel by a complement of bolts 19 and dowels 20 as shown in FIGS. 6B and 6C. Each tier can be analyzed as independent elements of relatively little weight and size for all anticipated conditions, including a loss of coolant accident seismic event. Approximately 35 cooling holes 16, shown in FIG. 5, are drilled throughout the partial radial core reflector length and will be needed in order to satisfy the maximum steady state metal operating temperature requirement of approximately 640° F. (337.8° C.).

FIG. 5 also shows the interface between the partial core reflector and the adjoining baffle plate 2 and former 3 subassemblies. Bolts 9, affix the baffle plate at each of the seven former 3 elevations. The dowel 17 is only used at the fourth former elevation above the lower core plate 8 and is intended to provide some shear resistance against the baffle plate separating from its contact with the partial core reflector at interface 18 during a plant transient or an extremely high loading condition.

FIG. 6A shows an elevation view of the partial radial reflector 15 with the details of the bolts 19 and dowels 20, which affix the partial radial reflector to the lower core barrel shown in FIGS. 6B and 6C. The selection of the number and size of the bolts and dowels is chosen to maintain the partial radial reflector tiers in the functional condition needed to constrain the core and maintain a coolable core geometry under the worst loading conditions. The partial radial reflector is shown as three vertical tiers 15 for a total of 12 tiers. Three tiers are chosen in order to minimize the vertical distance between dowels 20 and the most distant bolts 19, since differential thermal expansion between the partial radial reflector and the core barrel will induce deflection that produces bending stresses in the bolts 19. At plant operating conditions, the partial radial reflector temperature may be approximately 50° F. (10° C.) higher than that of the core barrel. While three axial partial radial reflector segments are considered optimum, either two or four may be used.

The gap 21, between tiers 15, is approximately 0.060 inches (1.5 mm) to accommodate the tiers coming together due to thermal expansion. A miter cut 27 at the interface between segments 15 is angled to provide a metal barrier that will reflect rather than pass fast neutrons exiting the core on a horizontal radial path toward the pressure vessel 6.

It should be noted that the outside diameter of the partial radial reflector is not in full contact with the core barrel inside diameter. A small separation 23, as can be seen in FIG. 6B, is provided at vertical intervals so coolant water circulation can cool the outside diameter of the partial radial reflector. At the elevations of the miter gaps 21, the outside radius of the partial radial reflector is in full contact with the core barrel inside diameter. This is to prevent coolant leakage through the miter gap entering the core region at this interface. For the same reason, two formers 3 are positioned, in elevation, adjacent to and abutting against the partial radial reflector miter gap 21, on both its sides, to shut off coolant leakage into the core at these interfaces.

One large manufacturing advantage of the partial radial reflector concept is that the tiers 15 are of a size and weight where a gun drilling machine can perform the operation of drilling the cooling holes 16 through lengths even greater than what is shown. Conventional portable drilling equipment is currently limited to drill depths of approximately 21 inches (53.3 cm) in 304 stainless steel. Therefore, if the tiers were much larger, circumferentially, so that they would not fit in a gun drilling machine setup then perhaps eight tiers 15 would be required to accommodate the limitations of conventional portable drilling equipment, instead of three to span the vertical core height. In that case, counting all four axes, 32 sections would be required as compared to 12 specified by this invention. If 32 sections were required, that would mean 32 setups would be needed to drill 35 cooling holes 16 in each tier for a total of 1,120 holes. With only the 12 tiers needed, 420 holes are required, which is a considerable difference.

FIG. 7 illustrates the hardware that is preferred for the interface between the partial radial reflector tiers 15. Two hollow dowels 24 are provided to precisely center one tier upon another so that a flat vertical face along the entire length of the partial radial reflector is presented to the core. Also, it ensures that there is no "snagging" of the peripheral fuel assembly grid 26 shown in FIGS. 3 and 8, as fuel assemblies are inserted or withdrawn as they pass against the miter gap edges 21 of the partial radial reflector tiers 15.

Cooling hole flow sleeves 28 are designed to bridge the gap between tiers 15 and thus provide uninterrupted continuity of coolant flow at each coolant flow hole. They are not intended to be load-bearing elements. Sleeves are a light press fit into the lower tier with a liberal clearance in the adjoining tier above as shown in FIG. 7A. The sleeves provide an added barrier against any coolant flow exiting at the miter gap 21 into the core region, but allows coolant flow continuity between tiers. While preferred to reduce leakage, the sleeves may be considered optional.

FIG. 8 illustrates the geometry of the reactor internals components in a lower corner section of the core, which direct core coolant flow into the partial radial reflector bottom tier chamber 29, where it is then dispensed upwards through all the various partial radial reflector cooling holes. This flow represents "bypass coolant," i.e., coolant which does not flow through the core, and therefore becomes inefficient flow since its temperature is not raised. Generally, about 1.0% of the total coolant flow is budgeted for the partial radial reflector cooling. About 3.2% is budgeted for the full circumferential reflector cooling.

The coolant flow, after making 180° turn in the lower pressure vessel plenum 25 flows upward through the lower core support plate 30 and through the lower core plate 8 where some percentage of flow feeds through a gap between the lower core plate and the bottom of the partial radial reflector and into the chamber 29, passing through small constrictive flow holes 22 (0.25 inch diameter (6.35 mm), for example) shown in FIG. 8. The desired pressure drop is thus achieved before release of the bypass coolant into the larger partial radial reflector coolant holes 16 and upward. Pressure differential, radially, across the partial radial reflector is targeted as zero, as the pressure drop through the length of the partial radial reflector matches that through the length of the fuel assembly. If there is a small ΔP difference, the ΔP is directed radially outward so the fuel assembly is "pressed" into the face of the partial radial reflector instead of the alternative, whereby coolant flow would escape through the partial radial reflector miter joints gaps 21, into the core region at some velocity and impact the fuel assembly rodlets with the possibility of causing damage.

The foregoing discussion with regard to the partial reflector is presented for application in two and three-loop nuclear pressurized water reactors as the best choice for a utility seeking to extend the life of its nuclear plants to reach 54 EFPY of operation without exceeding the fast neutron fluence limit on the pressure vessel inside diameter while also eliminating baffle bolts 9 in the high fluence zones. With lower internals replacement new core baffle bolts are installed throughout the remaining circumference of the core barrel.

However, utilities may have different priorities and therefore choose a full circumference radial core reflector or a variation of the partial radial reflector. For example, instead of employing the partial radial reflector tiers 15, shown in FIGS. 5-7, which spans almost all of the vertical distance between core plates (approximately 156 inches (3.96 m)), the utility may elect to span only the central region of the core (approximately 104 inches (2.64 m)) and require then only two tiers for the partial radial reflector. The remaining distance above and below the two-tier partial radial reflector can be made up of the conventional baffle-former design. This would represent a less expensive, albeit not as effective, alternate for the utility. Another alternative would be not to affix the partial radial reflector tiers to the core barrel with bolts and dowels, but instead, clamp them to the lower core plate with one or two tie rods 35, similar to the scheme, shown in FIGS. 11A, 11B and 11C, which is presently implemented in a full radial core reflector design for a state of the art 257 fuel assemblies core. Other restraints between the partial radial reflector, thus clamped, and the core barrel would then have to be provided to take horizontal service and accident loads. These types of restraints are identified by reference character 36 shown at the upper and lower portions of the core barrel of the full radial reflector illustrated in FIGS. 11A, 11B and 11C.

Partial Radial Reflector for a Four-Loop Nuclear Plant

The same drivers exist for reactor internals replacements of existing four-loop, 1,000 mw nuclear power plants as were stated for the two and three-loop power plants described above. The significant difference between the four-loop plants and the two and three-loop plants is that the maximum neutron fluence occurs at the 45° axes instead of the cardinal axes, as is the case in two and three-loop power plants. This means that a partial radial reflector placed straddling a 45° axis will have a much different geometry than one on the cardinal axis. FIG. 9 and FIGS. 10A, 10B and 10C show a four-loop partial radial reflector configuration. The "face" that the 45° partial radial reflector presents to the core must have the "staircase" geometry as seen in the plan view in FIG. 9, to accommodate the core configuration. However, the short distance 31 between the corner of the fuel assemblies 1 and the core barrel 4, at this juncture leaves little space to provide the necessary shielding thickness to meet the pressure vessel neutron fluence accumulation limit.

One possible solution to this problem is to install "suppressor rods" 13 (formed from hafnium or stainless steel) in lieu of fuel bearing rods in the extreme corners of the fuel assemblies 1 as identified in FIG. 9. A 17×17 fuel assembly has a compliment at 264 fuel bearing rods. This means that nine to twelve suppressor rods in the corners of a fuel assembly closest to the inner wall of the reactor vessel will likely solve the shielding issue. If it is twelve suppressor rods in each of eight fuel assemblies, i.e., two abutting each partial reflector, this will represent a loss of 96 fuel rods or about ⅓ of one fuel assembly. This loss is more than compensated for by the neutron reflection feature of the partial reflector which will increase fuel utilization by approximately 1%. This equates to approximately 10 mw in the 1,000 mw four-loop plant which features a 193 fuel assemblies making up the core. All of the advantages noted for the partial core reflector for the two and three-loop plants apply as well to the four-loop units. However, the core perimeter will be made up of the standard bolted baffle/former configuration except for the four azimuth zones occupied by the partial radial reflector shown in FIG. 9.

The suppressor rods 13 may prevent the utility from using the "out-in-out" fuel management scheme which would be preferred. However, as the pressure vessel material specimens are monitored at intervals over the course of the reactors remaining life, a favorable neutron accumulation trend may be found which would then permit the replacement of the eight suppressed assemblies with standard fuel assemblies. If this would be the case, the out-in-out fuel assembly rotation scenario could then be implemented.

A second alternative for the utility is to abandon the "suppressor" rods 13 and opt for the now standard neutron panels 33, shown in FIG. 9, for additional shielding. A cost/benefit study could determine the better of the two choices. FIG. 10A is an elevational view of the 45° partial radial reflector and FIGS. 10B and 10C respectively show the bolts and dowels 19 and 20 which secure the partial radial reflector tiers to the core barrel 4. As previously noted, former 3 abuts the tiers to seal off cooling flow leakage through the miter joint gap 21. Another five former levels 3 in addition to the two formers opposite the miter joints, comprise the total of seven, spaced vertically over the distance between core plates. These details can be seen in FIG. 3.

A third alternative is to increase the diameter of the core barrel 4 with a commensurate increase in the radial reflector outside diameter, e.g., a 2.25 in. (5.72 cm) diametrical increase. The other interfaces between the reactor vessel and the internals should accommodate this change. In such a case no suppressor rods or neutron panels would be required.

Full Circumferential Modular Radial Core Reflector

Further, in accordance with this invention, a full circumferential radial core reflector can be employed as an alternative to the partial core radial reflectors heretofore described. The full circumferential radial core reflector can be used as part of a reactor internals replacement for existing plants as well as state-of-the-art and next generation plants not yet constructed. It is especially appropriate where the cores may become larger and where the present radial core reflector design will be strained to keep up with the increased neutron fluence that the reactor vessel interior surface will experience as the result of the larger cores, especially when one considers the increased size and weight factors that such reflectors will present.

FIGS. 11A, 11B and 11C illustrate a current state of the art, prior art core arrangement which employs a full circumferential radial core reflector. This example illustrates a "full" radial core reflector for a 257 (17×17) fuel assembly core, with 144 inch (3.66 meter) fuel stack which requires a pressure vessel inside diameter of approximately 203 inches (5.2 meters). In this design, the radial core reflector vertical tiers 34 are clamped via tie rods 35 to the lower core plate 8 to secure the approximate 90 ton (81.65 metric tons) radial core reflector assembly in the vertical direction. Radial restraint is accomplished by hefty alignment pins 36, which connect the core barrel 4 to the radial core reflector 34 at the top and bottom flanges 39 and 40 of the radial core reflector. Between tiers, i.e., seven interfaces, and between the bottom tier and lower core plate 8 (the eighth interface) large dowel pins (approximately 5 inches (12.7 cm) in diameter and four per interface) are employed to prevent the tiers 34 from shifting horizontally, relative to each other, when high seismic impulse loads are experienced. Precise alignment between tiers is also required which is another function provided by the dowel pins, so that the tier faces present a substantially complete, continuous smooth surfaces allowing peripheral fuel assemblies to be inserted or withdrawn without "snagging" and being damaged by any unevenness at the tier interfaces. However, providing enough clearance to ensure that the four dowel pins engage at the tier interfaces, it is then possible that a mismatch of 0.020 inches (0.05 cm) can exist at each horizontal tier interface; seven total. With the modular reflector of this invention, there are only two horizontal interfaces, and with only two dowel pins engaging, the mismatch can be controlled to 0.007 inches (0.018 cm) or less. Hence, a fuel assembly, having as many as nine grids 26 must slide past only two seams with 0.007 inches (0.018 cm) mismatch vs. seven seams with 0.020 (0.05 cm) mismatch. With the component machining tolerances required to meet all these needs, manufacturing and assembly tasks for the state of the art designs pose a real challenge.

With this state of the art, prior art design, at least eight tiers are required to span the vertical height required to shield the pressure vessel from excessive neutron flux. The vertical cooling hole pattern, best seen in the plan view in FIG. 11A, is replicated throughout the tier stack. A multitude of approximately 1,600 holes, are needed to sufficiently cool the radial core reflector metal, constructed of 304 stainless steel, to satisfy an objective design goal of 10 to 1 metal to water ratio; this being conducive to the maximum increase in "fuel utilization" of approximately 3%.

This state of the art, prior art arrangement requires a separate set-up of each tier, on a large machining center, to drill the cooling holes. Furthermore, each tier has to be repositioned many times so as to bring all the hole locations within "reach" of the machine head travel. This is also true of portable machines which can be "brought to the work," and must be moved many times as well. This has significant cost and schedule implications for drilling the 1,600 holes through each of eight tiers, 12,800 holes of diameters in the range of approximately 0.562 to 0.875 inches (1.4 to 2.2 cm). There is also the need to drill, through the full length, passage holes for eight tie rods 35, plus the holes for the larger diameter dowels that are used to align the separate tiers at each tier interface, i.e., approximately 32 dowels. As will be appreciated hereafter, the full circumference radial reflector of this invention substantially improves on these circumstances.

The 90 ton (81.65 metric tons) radial core reflector weight, as it is now supported in the state of the art design, also affects other components of the lower reactor internals; most significantly, the lower core support plate 30 shown in FIGS. 3 and 11B. With the proposed full circumference radial core reflector of this invention, the entire weight of the radial reflector is evenly distributed around the inside wall of a lower core barrel as shown in FIGS. 12 and 13. Thus, in accordance with this invention, the lower core support plate 30 is relieved of a downward load of approximately 130 tons (117,934 kg) which is representative of a 293 fuel assemblies plant with a fuel stack height of 168 inches (4.27 meters). The 293 fuel assemblies core is representative of the direction of the next generation plants, i.e., 36 more fuel assemblies than the 257 fuel assemblies example, along with a 24 inch (61 cm) increase in fuel height that was mentioned above.

In accordance with this invention, the full core radial reflector is constructed with 24 to 32 relatively small circumferential reflector segmented elements as opposed to the current state of the art eight to ten toroidal-shaped axial tiers 34, which are much larger and are shown in FIG. 11(B). The design of this invention offers advantages such as, much shorter lead times for obtaining materials (lead times for large forgings can be 18 months or more), manufacturing machines/methods, handling, final assembly, manufacturing schedule, and shipping and reduced total cost. Desirably, the segmented reflector elements of this invention are not contiguous and are affixed to the inside diameter of the reactor internals lower core barrel 4 using a pattern of bolts and dowel pins similar to that previously described for the partial reflectors. In contrast, the toroidal tiers of the prior art are stacked one on top of the other (nine total), forming a single massive unit which would weigh approximately 115 tons (104.3 metric tons) in the case of a 293 fuel assembly core. This entire structure would be clamped as a single entity to the lower core support plate by way of at least eight longitudinal tie rods 35, of an approximate diameter of 2.5 inches (6.4 cm). The tie rods are threaded into the lower core plate 8 support ledge, as shown in FIG. 11C, then clamped with a lock nut at the top when all the tiers 34 have been assembled. Almost the entire weight of the tiered assembly is born by the lower core support plate 30, whereas in accordance with this invention, twenty-four circumferential segmented reflector elements are disposed over the full height and circumference of the core barrel, there by adding no load to the lower core support plate. Since the segmented design is not contiguous, stress levels cannot build in the corners. This means that the minimum ligament width 31 (FIG. 9) requirement is no longer dictated by stress level requirements.

In the analysis of the core, in accordance with this invention, each reflector element will be treated as an individual mass weighing perhaps 12,000 pounds (5.4 metric tons), which is readily secured with a plurality of small bolts and dowels to withstand the high "g" loads experience during a seismic or loss of coolant accident event. The nine tier assembly on the other hand, would be a single mass of approximately 230,000 pounds (104.33 metric tons), which creates a whole different matter with regard to the size and number of components and features that will be needed to restrain such an assembly during a high load episode.

In addition, the relatively small circumferential and axial segments of the full circumference reflector of this invention are relatively easy to handle and machine as compared to the much larger toroidal tiers of the reflectors of the prior art. The toroidal tiers require a portable machine to drill the cooling flow holes through each tier, where the practical maximum drill depth in 304 stainless steel is approximately 21 inches (53.3 cm), which sets the maximum thickness of a tier. About 1700 cooling holes, with diameters ranging from 0.625 inches to 0.875 inches (1.6 cm to 2.2 cm) are required to effectively cool the reflector metal in each tier. Nine tiers requires that 9×1,700=15,300 individual hole positions must be addressed by the drilling apparatus. On the other hand, the much smaller reflector element segments of this invention can be mounted on a conventional gun drilling machining center. Here, the drill depth is not the limiting factor. For the design of this invention, a reflector element length of approximately 61 inches (1.5 meters) is selected for the 168 inch (42.7 m) fuel length, but can be decreased based on the designer's preference, as balanced against other design requirements and priorities. With about 213 cooling flow holes per full circumference radial core reflector element, and 24 elements, the number of holes to be addressed is 213×24=5,112, i.e., only about 33% of the total tier set-ups required for a toroidal tier design.

Assembly of the full circumference radial reflector segments has an advantage over the radial reflector tiers in that the tiers have to be lowered, one atop the one below, each weighing in the order of 25,500 lbs. (11,567 kg). The full circumference radial reflector segments of this invention weigh approximately between 12,000 lbs. (5,443 kg) and 8,770 lbs (3,978 kg). The heavier segments can be assembled first (those on the 0°, 90°, 180° and 270° axis), either lowered or moved radially (horizontally) into the core barrel. Then the four remaining heavier segments, in each tier can be lowered or moved into position horizontally.

In regard to the pressure vessel neutron shielding, the nine tier radial reflector design of the prior art has an interface gap at eight elevations of approximately 0.01 inch (0.25 mm) or less, through which fast neutrons can stream and impinge the pressure vessel inside diameter. Next generation plant designs, now being considered, are expected to operate for 72 Effective Full Power Years with a budgeted $1\times10^{20}$ n/cm$^2$ maximum accumulation on the pressure vessel wall at the end of life. The reflector design of this invention has an interface gap at only two elevations and instead of the interface being flat and fully horizontal, it is mitered approximately at an angle of between 25° and 45°, whereby fast neutrons find no uninterrupted horizontal path to the pressure vessel inside diameter. A 30° miter is selected as a preferred example so as to minimize the thickness of the abutting formers at these locations for the partial radial reflectors where formers may be employed to interface with the circumferential end of the radial reflector segments.

Considerable stiffening of the lower core barrel is an advantage of this invention that results from the rigid reflector elements being affixed around at least portions of the full circumference of the core barrel over a height of approximately 183 inches (4.65 meters), which assumes a fuel stack height of approximately 168 inches (4.3 meters). This results in a lowering of the lower internals natural frequency in both the beam and shell modes, putting the internals assembly at less risk to the effects of flow induced vibration. Core barrel thickness needs to be increased only marginally, or not at all, as the core size grows from 257 fuel assemblies to 293 fuel assemblies because of the reflectors' stiffening affect.

Another large benefit of this invention derives from the fact that the radial core reflector elements affixed directly to the inside diameter of the core barrel do not require the flanges of the design associated with reference characters 39 and 40 in FIG. 11B. Thus, the space between the reflectors' toroidal outside diameter and the inside diameter of the core barrel can be reduced with no longer the need of the space occupied by the alignment pins 36. In turn, the diameter of the core barrel 4 can be reduced, along with the inside diameter of the pressure vessel. Considering the pressure vessel size reduction alone, besides the substantial material cost savings, the size of the entire reactor vapor container can be made smaller. The dominant challenge in forging larger structural elements as one piece, is the pressure vessel head. Therefore, any reduction in pressure vessel diameter has many favorable ramifications, e.g., smaller containment equipment hatch, less load on the pressure vessel supports, less shipping concerns, etc.

The 293 fuel assemblies core proposed herein can, of course, be scaled upwards or downwards, with downwards an easier course. Upwards is more difficult as forging size and manufacturing capacity come into play. Cores configured with 313, 325 and 333 or more fuel assemblies are possible. There is a point of diminishing return, however, when the size of other components, such as the pressure vessel head, make further expansion of the core impractical, because at some point, manufacturing capabilities will be exceeded.

Another significant benefit is derived from the strengthening of the core barrel with this invention. Conventionally, six lower tier radial support keys 32 shown in FIG. 11A, are affixed to the lower core support plate 30 and engage six pressure vessel devices which are keyways machined in "saddles" affixed to the pressure vessel inside diameter. The lower reactor internals, bearing the mass of 293 fuel assemblies, and its own weight would displace in a pendular motion in a seismic or loss of coolant accident event were they not restrained. The lower radial support keys provide this restraint, absorbing and transferring the high loads to the much more substantial pressure vessel. Because of the size of these six key-keyway geometries, a significant amount of downcomer coolant flow, approximately 20% is blocked in the annulus between the reactor vessel and the core barrel, just above where the flow enters the pressure vessel lower plenum 25. This has an adverse affect on the uniformity of core inlet flow distribution and there is also the pressure drop penalty that the geometries inflict. The strengthening of the core barrel in accordance with this invention enables a modification of this design as will hereafter be appreciated, that minimizes these affects.

Further, with the radial core reflector tier design of the prior art, there would need to be a set-up in the manufacturing shop to confirm that the design requirements have been met, and then the radial core reflector for best final results, would be disassembled for packaging and shipment to the plant site. Another tedious process of final assembly will then be required at the site, under not the best conditions. The design of this invention will permit final assembly of the radial core reflector in the shop and due to the stiffening of the core barrel, all of the radial core reflector hardware will be left installed for shipping. This represents a significant benefit in terms of reduced labor hours, extra cleaning, packaging and schedule reduction.

FIG. 16 shows the "jigsaw" fit between adjoining radial core reflector elements of this invention wherein the circumferential ends have a stepped interface formed from alternating angles with adjacent alternating angles bent in opposite directions. The "stepped joint" 41 reduces any coolant water leakage into or out of the core area because of the pressure drop effected by the right-angled flow path through the joint.

The total surface area of the total radial core reflector of this invention is approximately 5,450 inches$^2$ (3.5 meters$^2$) without flow holes. With a length of 185 inches (4.7 meters) (the embodiment shown in FIG. 12), the total weight of 24 radial core reflector elements, computes to be approximately 286,450 pounds (129,932 kg). With a 10:1 metal to water ratio, after all coolant flow holes are drilled, the weight would be reduced to approximately 260,500 pounds or 130 tons (117,934 kg). Each of the radial core reflector elements, before cooling hole machining would weigh approximately 286,450÷24=12,000 pounds (5,443 kg); which would be the set-up weight on the gun drilling machine.

Lower Radial Support Key Modification

A reactor internals structure of the size to accommodate 293 fuel assemblies, which is an example used in this specification, will require at least six key/keyway positions as seen in FIGS. 12 and 14A, 14B, 14C and 14D. Because of the high load imparted to these keys/keyways, during a seismic or loss of coolant accident event, they must be substantial in size, and affixed to a solid base. In all current conventional designs, including radial core reflector concepts, the lower core support plate 30 shown in FIGS. 2 and 3, is that base. As the number and size of the radial support keys increase to match increasing core sizes and mass, a penalty is incurred in the form of flow blockage as downcomer coolant flow in the annulus between the pressure vessel and the core barrel encounters the key/keyway geometries and debouches into the pressure vessel lower plenum 25. Another penalty is incurred which results from this significant flow blockage and comes in the form of increased ΔP across the key/keyway geometries. FIG. 12, which depicts the 10.5 inch (26.7 cm) wide annulus, would have a total annulus flow area of approximately 6,650 inches$^2$ (4.3 meters$^2$). The area obstructed by the six key/keyway locations could be as much as 1330 inches$^2$ (0.86 meters$^2$). In other words, 20% of the flow into the vessel plenum is blocked. The implications of this are that peripheral fuel assemblies in the core regions that occupy the same general azimuthal locations as the radial support keys (see FIG. 12, for example), could experience coolant flow starvation and thus be in violation of the design specification requirement governing "uniformity" of core inlet flow distribution.

As stated above, a lower radial support key must be based in a rigid structure that can safely withstand the high impact loads that are imparted in an accident scenario. As a result of the design of this invention, which uniformly affixes radial core reflectors elements to the lower core barrel inside circumference, the core barrel now qualifies as that "rigid structure" to which radial support keys may be attached. Thus, this invention also facilitates relocating the radial key/keyway positions to reduce the coolant flow blockage.

Thus, in accordance this invention, three of the six lower radial support keys 42, are elevated by a height 45 from their normal position at the lower end of the core barrel, and are seated in a band 46 which is machined in the lower core barrel 4, to a depth of 47 of approximately 0.25 inches (6.4 mm) as shown in FIGS. 14A, 14B, 14C and 14D. The vertical fit of the radial support keys in the band 46 is intended to have zero clearance to a small interference, perhaps 0.006 inch (0.15 mm) maximum. The azimuthal location of the radial support keys 42 is shown in FIG. 15. The radial support keys which remain in their normal locations are identified by reference character 32. The vertical separation 45 between the two sets of radial support keys is determined to allow the downcomer, coolant flow to "fully reform" after passing through the higher radial key elevation and, before entering the pressure vessel lower plenum, suffering the blockage presented by only the three radial support keys positioned at the lower elevation. It is suggested that a separation of two times the radial support key length, i.e., 2×20.25=40.5 inches (102.9 cm) will allow the downcomer coolant flow to "fully reform after passing through the higher radial key elevation and before entering the pressure vessel lower plenum 25; suffering the blockage presented by only the three radial support keys positioned at the lower elevation." A flow blockage that would have been 20% is now effectively reduced to 10%. The next generation plants, now in planning, have proposed cores numbering more than 293 fuel assemblies. Radial support key locations can be expected to increase from six to eight. The advantage of the staggered elevation of the radial support keys becomes even more significant in such designs.

The full circumference, segmented radial core reflector of this invention can replace another state of the art concept which employs a welded baffle plate design shown in FIG. 17, which forms the core enclosure, similar to that shown in FIGS. 3 and 4. With the segmented design of this invention significant benefits would be derived. It should be noted that the design of FIG. 16 requires neutron panels 33 to provide the pressure vessel sufficient irradiation shielding.

With the segmented, full circumference radial core reflector replacement design of this invention shown in FIG. 18 the pressure vessel life can be extended from fifty-four to seventy-two EFPY, based upon allowable fast neutron dose accumulation, which is a significant benefit to a potential customer. Four extra fuel assemblies 51, shown in FIG. 18, can be added, raising the total from 157 to 161, without the need of increasing the pressure vessel diameter or violating the minimum shielding requirements at the 45 degree, 135 degree, 225 degree and 315 degree reflector axes. An additional 23 Mwe can be derived with their addition. By combining the extra power output represented by the extra fuel assemblies, the reduction of by-pass leakage, and the increased fuel utilization via reflected neutrons, a utility customer could elect to maintain all its operating parameters, and instead reduce the enrichment of its fuel, which is a very attractive alternative. Considering that the cost of a single fuel assembly is in excess of $2,500,000 and that the fuel represents 95% of that cost, if the utility could save 5% of the fuel cost, the 161 fuel assembly core would save the utility approximately $19,000,000; which would be compounded for replacement fuel assemblies.

Additionally, as can be seen in FIG. 17, traditionally, specimen baskets 48 which are employed to hold specimens that are used to analyze the state of the reactor vessel material over the life of the reactor, as a result of irradiation embrittlement, typically are supported on the outside of the core barrel 4 in the annulus between the core barrel and the reactor vessel 6. Conventionally, passage holes 50 (FIG. 13) are bored through the lower core barrel flange directly above each conventional specimen basket so pressure vessel material specimens can be withdrawn periodically, using long handled tools, for evaluation. These holes have plugging devices installed before the plant resumes operation. As seen in FIG. 18, in accordance with this invention, the specimen baskets can be located within the confines of the radial core reflector, e.g., in an opening machined in the surface of the radial core reflector, and thus eliminate the potential for damage as the reactor internals are removed and inserted in the pressure vessel and when being transported between the pressure vessel and the internals support stand. With the new locations of the specimen baskets, machining costs are reduced, no plugs are required and the plant outage period is reduced. Weight of the radial reflector segments are reduced due to the cut-out of the baskets, which means lower loss of coolant accident and seismic loads at all interfaces between the reactor internals and the pressure vessel. Thus, this invention has a number of added benefits that enhance the evolution of the design of pressurized water reactors.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor lower internals structure having an axial and a circumferential dimension comprising:
   a tubular core barrel supported coaxially within the lower internals and having an inside vertically extending surface and an upper and lower end; and
   a reflector having a plurality of axial and circumferential segments and an outside curvature that substantially matches a curvature of the inside surface of the core barrel and contacts at least a substantial portion of the inside surface of the core barrel covered by the reflector, is supported substantially over at least a central axial length of the core barrel that extends substantially from or above the lower end toward the upper end and over at least a portion of the circumferential dimension covered by the reflector, the reflector further has an inside contour that matches an outside contour of an abutting array of a plurality of nuclear fuel assemblies that are designed to be supported within the core barrel to form a nuclear core and the axial and circumferential reflector segments are separately, fixedly connected to and respectively supported by the inside vertically extending surface of the core barrel at a plurality of axial and circumferential locations and wherein the reflector does not extend substantially continuously from the lower end to the upper end of the core barrel and is divided into axial sections that interface with each other at an acute angle with the inside surface of the core barrel.

2. The nuclear reactor lower internals structure of claim 1 wherein the circumferential sections have a stepped interface with each other formed from alternating angles wherein adjacent alternating angles are bent in opposite directions.

3. The nuclear reactor lower internals structure of claim 2 wherein the alternating angles are substantially right angles.

4. The nuclear reactor lower internals structure of claim 1 wherein at least two of the circumferential sections are spaced from each other and are separated by a baffle and former structure.

5. The nuclear reactor lower internals structure of claim 1 wherein the acute angle is approximately between 25° and 45°.

6. The nuclear reactor lower internals structure of claim 5 wherein the acute angle is approximately thirty degrees.

7. The nuclear reactor lower internals structure of claim 1 wherein the number of axial sections is either three or four.

8. The nuclear reactor lower internals structure of claim 1 wherein there is a space provided between interfacing axial sections.

9. The nuclear reactor lower internals structure of claim 1 wherein at least two of the circumferential sections are spaced from each other and are separated by a baffle and former structure, wherein a former plate is positioned to cover substantially each circumferential end of the interface of the axial sections.

10. The nuclear reactor lower internals structure of claim 1 wherein the circumferential sections are not contiguous.

11. The nuclear reactor lower internals structure of claim 1 including a plurality of axially extending coolant channels between the outside curvature of the reflector and the inside surface of the core barrel.

12. The nuclear reactor lower internals structure of claim 1 wherein the reflector does not extend substantially continuously from the lower end to the upper end of the core barrel and is divided into axial sections that interface with each other including axial coolant channels through the reflector that extend across the interface and tubular sleeves inserted and closely received within at least some of the coolant channels in the vicinity of the interface that span the interface.

13. The nuclear reactor lower internals structure of claim 1 wherein the core barrel is attached to a reactor vessel at a plurality of spaced circumferential locations by a plurality of attachment bracket arrangements that maintain a space between the reactor vessel and an outside of the core barrel, wherein at least two of the attachment bracket arrangements are positioned circumferentially around and affixed to an outside surface of the core barrel at substantially different axial elevations.

14. The nuclear reactor lower internals structure of claim 13 wherein adjacent attachment bracket arrangements are positioned at the substantially different axial elevations.

15. The nuclear reactor lower internals structure of claim 13 wherein the space between the reactor vessel and the outside of the core barrel forms a coolant path and the substantially different axial elevations are spaced far enough apart so that coolant blocked by one of the attachment bracket arrangements at an upper elevation is reformed directly below the one of the attachment bracket arrangement before the coolant reaches a lower axial elevation of the next attachment bracket arrangement at the substantially different axial elevation.

16. The nuclear reactor lower internals structure of claim 1 wherein the reflector includes a specimen basket for supporting a radiation specimen.

17. The nuclear reactor lower internals structure of claim 16 wherein the specimen basket is positioned within a hollowed out portion of the reflector.

18. The nuclear reactor lower internals structure of claim 17 wherein the hollowed out portion extends from a top surface of the reflector.

* * * * *